(12) United States Patent
Hashimoto et al.

(10) Patent No.: US 9,840,970 B2
(45) Date of Patent: Dec. 12, 2017

(54) CONTROL DEVICE FOR MULTI-CYLINDER ENGINE

(71) Applicant: MAZDA MOTOR CORPORATION, Hiroshima (JP)

(72) Inventors: Masanori Hashimoto, Hiroshima (JP); Hisashi Okazawa, Hiroshima (JP); Toshiaki Nishimoto, Hiroshima (JP); Akira Tsuda, Hofu (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/769,304

(22) PCT Filed: Mar. 10, 2014

(86) PCT No.: PCT/JP2014/001345
§ 371 (c)(1),
(2) Date: Aug. 20, 2015

(87) PCT Pub. No.: WO2014/156012
PCT Pub. Date: Oct. 2, 2014

(65) Prior Publication Data
US 2015/0377151 A1    Dec. 31, 2015

(30) Foreign Application Priority Data

Mar. 29, 2013    (JP) .................................. 2013-073913

(51) Int. Cl.
*F01L 1/34* (2006.01)
*F02D 13/02* (2006.01)
(Continued)

(52) U.S. Cl.
CPC ...... *F02D 13/0215* (2013.01); *F01L 13/0005* (2013.01); *F01M 1/16* (2013.01);
(Continued)

(58) Field of Classification Search
CPC .......... F01L 13/0005; F01L 2013/0084; F02D 13/0215; F02D 13/02; F02D 17/02;
(Continued)

(56) References Cited

U.S. PATENT DOCUMENTS 6,553,951 B2 * 4/2003 Ogawa .................. F01L 1/3442
123/90.17
6,619,249 B2 * 9/2003 Sakuragi ................... F01L 1/34
123/198 F
(Continued)

FOREIGN PATENT DOCUMENTS

| CN | 101000001 A | 7/2007 |
|---|---|---|
| CN | 101513518 A | 11/2009 |

(Continued)

OTHER PUBLICATIONS

International Search Report for PCT/JP2014/001345 dated Jun. 3, 2014.
(Continued)

*Primary Examiner* — Zelalem Eshete
(74) *Attorney, Agent, or Firm* — Studebaker & Brackett PC

(57) ABSTRACT

The invention relates to a control device for a multi-cylinder engine provided with an oil pump, a hydraulically operated valve characteristic control device which changes valve characteristics of at least one of an intake valve and an exhaust valve; and a hydraulically operated valve stop device which stops at least one of the intake valve and the exhaust valve when a reduced cylinder operation is performed. The control device for a multi-cylinder engine is provided with a valve control unit which operates the valve stop device after an operation of the valve characteristic (Continued)

control device is completed when the valve characteristic control device is operated at a time of request for the reduced cylinder operation.

11 Claims, 13 Drawing Sheets

(51) Int. Cl.
    *F01M 1/16*      (2006.01)
    *F02D 17/02*      (2006.01)
    *F01L 13/00*      (2006.01)
    *F02D 13/06*      (2006.01)
    *F01M 1/08*      (2006.01)

(52) U.S. Cl.
    CPC .............. *F02D 13/02* (2013.01); *F02D 13/06* (2013.01); *F02D 17/02* (2013.01); *F01L 2013/001* (2013.01); *F01L 2013/0084* (2013.01); *F01M 1/08* (2013.01); *Y02T 10/18* (2013.01)

(58) Field of Classification Search
    CPC .. F02D 13/06; F01M 1/16; F01M 1/08; Y02T 10/18
    USPC ............................................ 123/90.17, 90.16
    See application file for complete search history.

(56) References Cited

U.S. PATENT DOCUMENTS

| | | | |
|---|---|---|---|
| 2009/0101093 A1 | 4/2009 | Ogawa et al. | |
| 2010/0313833 A1 | 12/2010 | Miyanoo | |
| 2010/0326383 A1* | 12/2010 | Auchter | F01L 1/34 |
| | | | 123/90.15 |
| 2012/0204823 A1 | 8/2012 | Kanai | |
| 2012/0291728 A1* | 11/2012 | Mehring | F01M 1/16 |
| | | | 123/90.12 |

FOREIGN PATENT DOCUMENTS

| | | |
|---|---|---|
| JP | H08-074608 A | 3/1996 |
| JP | 2010-001750 A | 1/2010 |
| JP | 2010-270701 A | 12/2010 |
| JP | 2012-167555 A | 9/2012 |

OTHER PUBLICATIONS

An Office Action issued by the Chinese Patent Office dated Apr. 26, 2017, which corresponds to Chinese Patent Application No. 201480014968.8; with partial English language translation.

* cited by examiner (HIGH TEMPERATURE)

(WARM STATE)

(COLD STATE)

(HIGH TEMPERATURE)

(WARM STATE)

(COLD STATE)

CONTROL DEVICE FOR MULTI-CYLINDER ENGINE

TECHNICAL FIELD

The present invention relates to a control device for a multi-cylinder engine to be installed in an automobile or a like vehicle, and more particularly, to a technical field of hydraulic control of a multi-cylinder engine.

BACKGROUND ART

Conventionally, in a multi-cylinder engine to be installed in an automobile or a like vehicle, there is known a technique, in which there are provided a hydraulically operated valve characteristic control device for controlling opening and closing timings of an intake valve and an exhaust valve depending on an operating condition of the engine, and a hydraulically operated valve stop device for stopping opening and closing the intake valve and the exhaust valve when the engine is in a low load condition so as to change valve characteristics and to perform a reduced cylinder operation by driving these devices for improving the fuel efficiency.

For instance, Patent Literature 1 discloses a technique, in which there are provided a hydraulically operated valve characteristic control device and a hydraulically operated valve stop device so as to change valve characteristics and to individually switch stopping/driving of exhaust valves by driving these devices. A valve stop mechanism disclosed in Patent Literature 1 is configured to switch flow of exhaust gas between a turbo-side exhaust passage and a bypass-side exhaust passage so as to quickly raise the catalyst temperature or to increase the supercharging pressure.

In Patent Literature 1, however, the capacity of an operating hydraulic pressure chamber (an advanced angle chamber and a retarded angle chamber) of a valve characteristic control device (VVT) is large. As a result, when operation periods of the valve characteristic control device and the valve stop device overlap each other, a hydraulic pressure to be supplied to the valve stop mechanism may be insufficient, which may lead to an inappropriate operation of the valve stop mechanism. The conventional art described in Patent Literature 1 is directed to switching between exhaust passages or to quickly raising the catalyst temperature, and fails to provide a solution to the problems as described above.

CITATION LIST

Patent Literature

Patent Literature 1: Japanese Unexamined Patent Publication No. 2010-001750

SUMMARY OF INVENTION

In view of the above, an object of the invention is to provide a technique in which a hydraulically operated valve stop device and a hydraulically operated valve characteristic control device are appropriately operated when a request of performing a reduced cylinder operation and a request of changing valve characteristics are output in such a mariner that operation periods of the valve stop device and the valve characteristic control device to be operated based on these requests overlap each other.

A control device of the invention that accomplishes the aforementioned object is applied to a multi-cylinder engine provided with an oil pump; a hydraulically operated valve characteristic control device which changes valve characteristics of at least one of an intake valve and an exhaust valve; and a hydraulically operated valve stop device which stops at least one of the intake valve and the exhaust valve when a reduced cylinder operation is performed, the valve characteristic control device and the valve stop device being disposed on a discharge oil path of the oil pump. The control device is provided with a valve control unit which operates the valve stop device after an operation of the valve characteristic control device is completed when the valve characteristic control device is operated at a time of request for the reduced cylinder operation.

DESCRIPTION OF EMBODIMENTS

In the following, an oil supply device 1 for an engine embodying the invention is described referring from FIG. 1 to FIG. 13.

Figure 1:
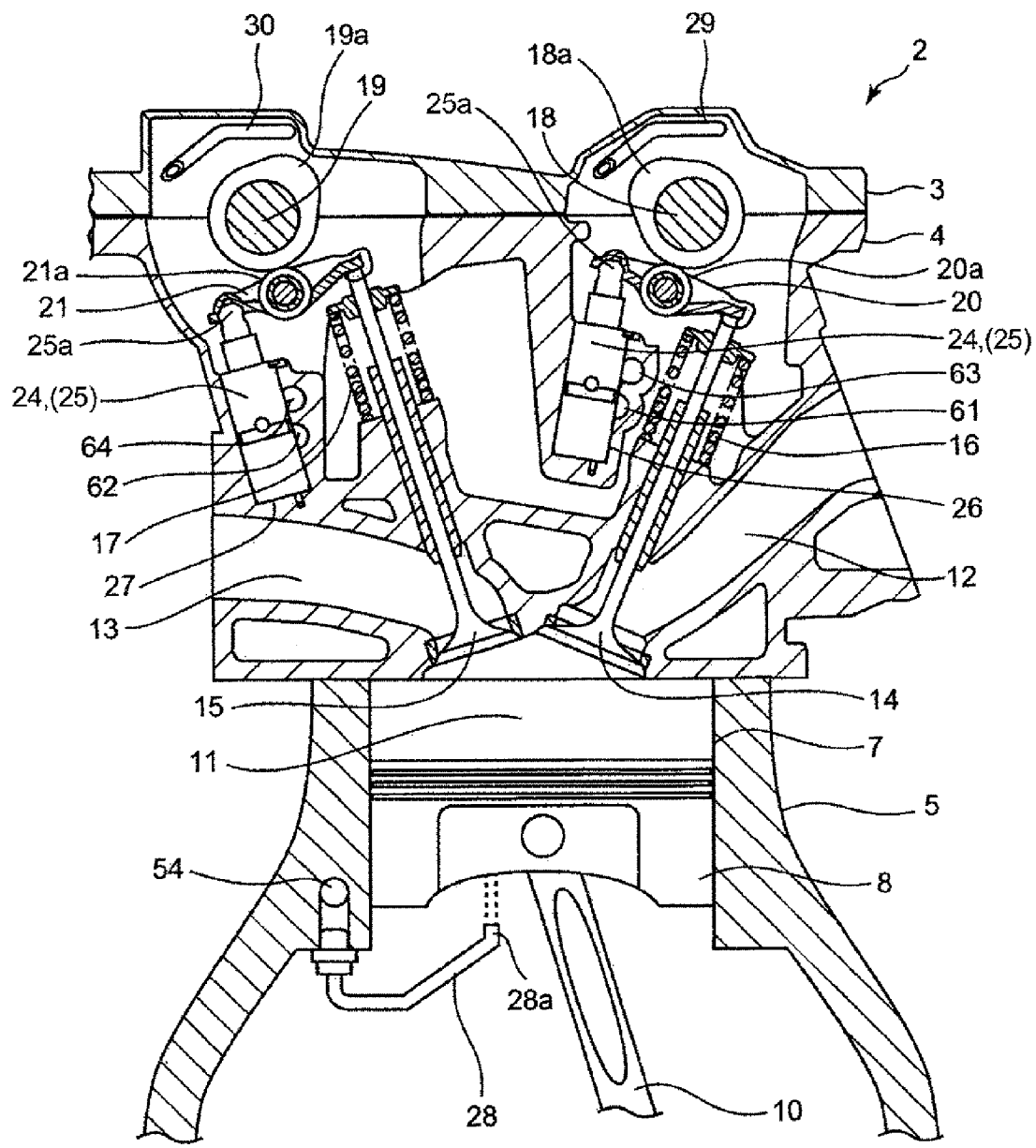
FIG. 1 is a diagram illustrating a schematic configuration of an engine embodying the invention.

First of all, an engine 2 to which the oil supply device 1 is applied is described referring to FIG. 1. As illustrated in FIG. 1, the engine 2 is an in-line 4-cylinder gasoline engine configured such that a first cylinder, a second cylinder, a third cylinder, and a fourth cylinder are disposed in this order in series (in a direction orthogonal to the plane of FIG. 1). The engine 2 is provided with a cam cap 3, a cylinder head 4, a cylinder block 5, a crankcase (not illustrated), and an oil pan 6 (see FIG. 4), which are vertically connected to each other. Four cylinder bores 7 are formed in the cylinder block 5. A piston 8 is slidably mounted in each of the cylinder bores 7. The pistons 8 are connected to a crankshaft (not illustrated), which is rotatably supported on the crankcase by connecting rods 10. A combustion chamber 11 defined by each one of the cylinder bores 7 and each one of the pistons 8 is formed in an upper portion of the cylinder block 5 for each of the cylinders.

The cylinder head 4 is formed with an intake port 12 and an exhaust port 13 opened toward each of the combustion chambers 11. An intake valve 14 for opening and closing the intake port 12 is mounted in the intake port 12, and an exhaust valve 15 for opening and closing the exhaust port 13 is mounted in the exhaust port 13. The intake valve 14 and the exhaust valve 15 are respectively urged in the closed direction (the upward direction in FIG. 1) by a return spring 16 and a return spring 17. The intake valve 14 is driven to open and close by a cam portion 18a formed on the outer periphery of a rotatable camshaft 18 and by a swing arm 20 disposed below the cam portion 18a, and the exhaust valve 15 is driven to open and close by a cam portion 19a formed on the outer periphery of a rotatable camshaft 19 and by a swing arm 21 disposed below the cam portion 19a. Specifically, as the camshafts 18 and 19 are rotated, a cam follower 20a that is rotatably disposed substantially at the middle of the swing arm 20 and a cam follower 21a that is rotatably disposed substantially at the middle of the swing arm 21 are respectively pressed downward by the cam portions 18a and 19a. Then, the swing arms 20 and 21 respectively swing around a top portion of a pivot mechanism 25a that is provided at respective one end sides of the swing arms 20 and 21, and the respective other ends of the swing arms 20 and 21 press the intake valve 14 and the exhaust valve 15 downward against the urging force of the return springs 16 and 17, whereby the intake valve 14 and the exhaust valve 15 are opened.

As the pivot mechanism 25a of the swing arms 20 and 21 for each of the second and third cylinders that are disposed at the middle of the engine, there is provided a well-known hydraulic lash adjuster 24 (hereinafter, called as HLA) for automatically adjusting the valve clearance to zero by a hydraulic pressure.

Further, as the pivot mechanism 25a of the swing arms 20 and 21 for each of the first and fourth cylinders that are disposed at both ends of the engine, there is provided a HLA 25 (see FIG. 1 and FIG. 2) provided with a valve stop function of stopping opening and closing the intake valve 14 and the exhaust valve 15. The HLA 25 provided with a valve stop function has, in addition to the function of automatically adjusting the valve clearance to zero, which is the same as the HLA 24, a function of switching between opening and closing the intake valve 14 and the exhaust valve 15 of the first (fourth) cylinder, and stopping opening and closing the intake valve 14 and the exhaust valve 15 of the first (fourth) cylinder depending on whether a reduced cylinder operation or an all cylinder operation is performed for the engine 2. Specifically, the HLA 25 allows the intake valve 14 and the exhaust valve 15 of the first (fourth) cylinder to open and close when an all cylinder operation is performed for the engine 2, and allows the intake valve 14 and the exhaust valve 15 of the first (fourth) cylinder to stop opening and closing when a reduced cylinder operation is performed for the engine 2. Thus, the HLA 25 has a valve stop mechanism 25b (see FIG. 2), as a mechanism for stopping opening and closing the intake valve 14 and the exhaust valve 15. The valve stop mechanism 25b corresponds to a valve stop device in the claims.

The cylinder head 4 is formed with mounting holes 26 and 27 for receiving and mounting a lower end of each of the HLAs 24 and a lower end of each of the HLAs 25 provided with a valve stop function. The cylinder 4 is further formed with oil paths 61, 62, 63, and 64 communicating with the mounting holes 26 and 27 for each of the HLAs 25 provided with a valve stop function. When the HLA 25 is mounted in the mounting holes 26 and 27, the oil paths 61 and 62 supply a hydraulic pressure (an operating hydraulic pressure) for operating the valve stop mechanism 25b of the HLA 25, and the oil paths 63 and 64 supply a hydraulic pressure for causing the pivot mechanism 25a of the HLA 25 to automatically adjust the valve clearance to zero.

The cylinder block 5 is formed with a main gallery 54 extending in the cylinder array direction within an exhaust-side side wall of the cylinder bores 7. An oil jet 28 communicating with the main gallery 54 for cooling the piston 8 is formed at a position near the lower portion of the main gallery 54 for each of the pistons 8. Each of the oil jets 28 has a nozzle portion 28a disposed below the corresponding piston 8. The oil jet 28 is configured to inject engine oil (hereinafter, simply called as "oil") onto the back surface of the top portion of the piston 8 through the nozzle portion 28a.

Oil showers 29 and 30 in the form of a pipe are respectively provided at a position above the camshafts 18 and 19. Lubricant oil supplied from the oil showers 29 and 30 is showered onto the cam portions 18a and 19a of the camshafts 18 and 19 that are disposed below the oil showers 29 and 30, and onto contact portions between the swing arm 20 and the cam follower 20a disposed further below the cam portion 18a and between the swing arm 21 and the cam follower 21a disposed further below the cam portion 19a.

Next, the valve stop mechanism 25b, which is one of the hydraulically operated devices, is described referring to FIG. 2. The valve stop mechanism 25b is a mechanism for switching between a reduced cylinder operation in which opening and closing the intake valve 14 and the exhaust valve 15 of the first (fourth) cylinder are stopped depending on an operating condition of the engine 2, and an all cylinder operation in which opening and closing the intake valves 14 and the exhaust valves 15 of all the cylinders are performed by operating all the HLAs 24 and the HLAs 25 in an ordinary state.

As described above, the HLA 25 provided with a valve stop function is provided with the pivot mechanism 25a and the valve stop mechanism 25b. The pivot mechanism 25a is a mechanism for automatically adjusting the valve clearance to zero by a hydraulic pressure, and has substantially the same configuration as the well-known HLA 24, which is used for the second and third cylinders. Therefore, description of the pivot mechanism 25a is omitted herein. The valve stop mechanism 25b is provided with an outer sleeve 251 having a closed bottom and configured to slidably and axially accommodate the pivot mechanism 25a; a pair of locking pins 252 movable in and out of two through-holes 251a that are formed to face each other in side surfaces of the outer sleeve 251 for switching the pivot mechanism 25a disposed above the outer sleeve 251 to be slidably and axially movable between a locked state and a lock released state; a locking spring 253 which urges the locking pins 252 radially outward; and a lost motion spring 254 disposed between the inner bottom portion of the outer sleeve, 251 and the bottom portion of the pivot mechanism 25a for pressing and urging the pivot mechanism 25a upward of the outer sleeve 251.

Figure 2A:
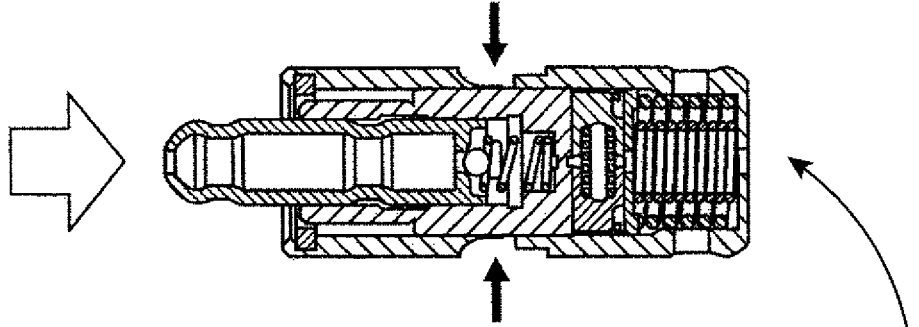
FIG. 2 is a sectional view illustrating a schematic configuration of HLA provided with a valve stop function.

As illustrated in FIG. 2A, when the locking pins 252 are engaged in the through-holes 251a of the outer sleeve 251, the pivot mechanism 25a is in a locked state such that the pivot mechanism 25a projects upward and is fixed. As illustrated in FIG. 1, when the pivot mechanism 25a is in the locked state, the top portion of the pivot mechanism 25a serves as a fulcrum of swing of the swing arms 20 and 21. Therefore, the cam portions 18a and 19a press the cam followers 20a and 21a downward by rotations of the camshafts 18 and 19. Then, the intake valve 14 and the exhaust valve 15 are pressed downward against the urging force of the return springs 16 and 17, whereby the intake valve 14 and the exhaust valve 15 are opened. Thus, bringing the valve stop mechanisms 25b for the first and fourth cylinders to a locked state makes it possible to perform an all cylinder operation.

Figure 2B:
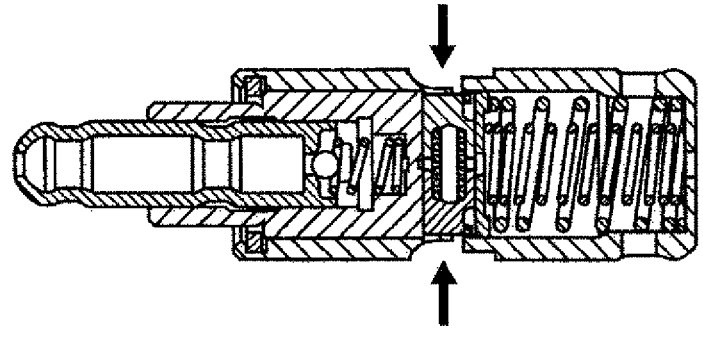

As illustrated in FIG. 2B, when the outer end surfaces of the locking pins 252 are pressed by an operating hydraulic pressure, the locking pins 252 are retracted radially inward of the outer sleeve 251 in such a manner as to come close to each other against the pulling force of the locking spring 253. Then, the engagement between the locking pins 252 and the through-holes 251 a of the outer sleeve 251 is released, and the pivot mechanism 25a disposed above the valve stop mechanism 25b is brought to a lock released state in which the pivot mechanism 25a is axially movable.

Figure 2C:
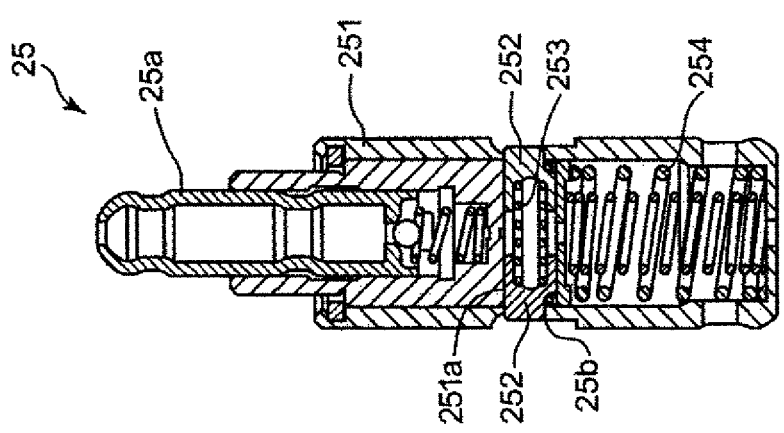

When the pivot mechanism 25a is pressed downward against the urging force of the lost motion spring 254, as the pivot mechanism 25a is shifted to the lock released state as described above, the pivot mechanism 25a is brought to a valve stopped state as illustrated in FIG. 2C. Specifically, the return springs 16 and 17 for urging the intake valve 14 and the exhaust valve 15 upward have a larger urging force than the urging force of the lost motion spring 254 for urging the pivot mechanism 25a upward. Therefore, when the valve stop mechanism 25b is in a lock released state, causing the cam portions 18a and 19a to press the cam followers 20a and 21a downward by rotations of the camshafts 18 and 19 allows the top portion of the intake valve 14 and the exhaust valve 15 to serve as a fulcrum of swing of the swing arms 20 and 21, and presses the pivot mechanism 25a downward against the urging force of the lost motion spring 254. In other words, the intake valve 14 and the exhaust valve 15 are kept in a closed state. Thus, bringing the valve stop mechanism 25b to a lock released state makes it possible to perform a reduced cylinder operation.

Figure 3A:
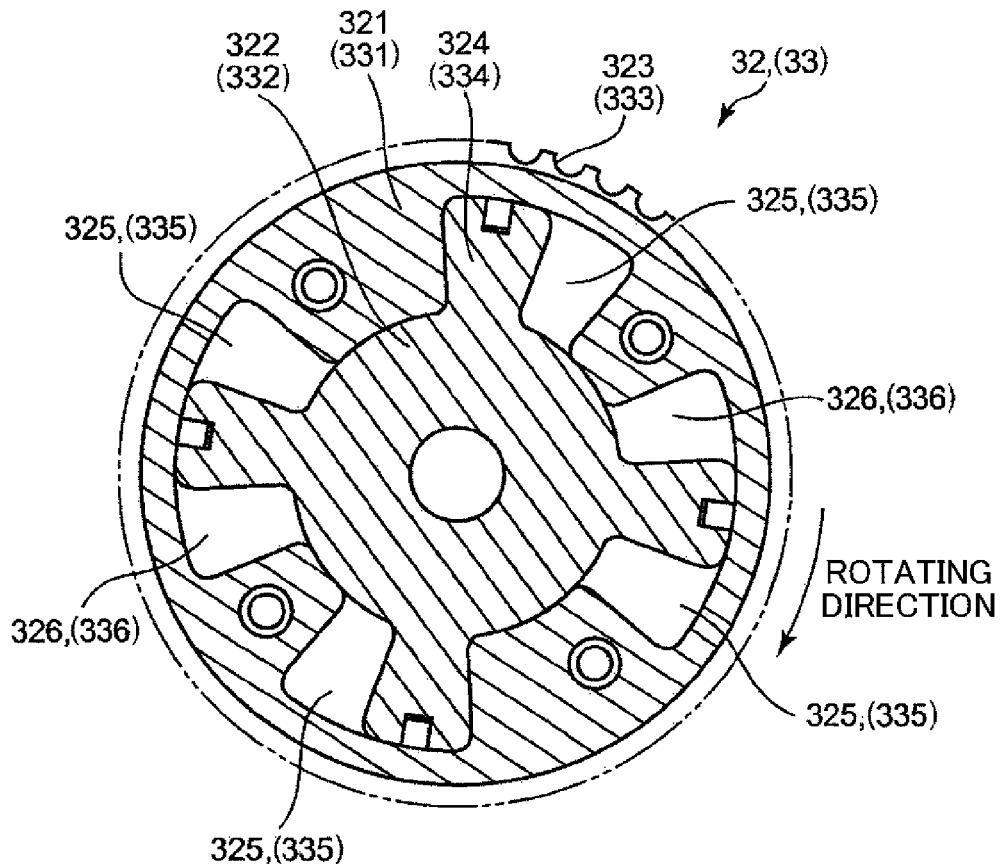
FIG. 3A is a side sectional view illustrating a schematic configuration of VVT.

The cylinder head 4 is provided with hydraulically operated variable valve timing mechanisms 32 and 33 (hereinafter, simply called as "VVT") illustrated in FIG. 3A. The VVT 32 is configured to change the opening and closing timings of the intake valve 14, and the VVT 33 is configured to change the opening and closing timings of the exhaust valve 15. The VVT 32 for the intake valve 14 and the VVT 35 for the exhaust valve 15 have the same structure as each other. Specifically, the VVT 32 (33) has a substantially annular housing 321 (331), and a rotor 322 (332) which is housed in the housing 321 (331). The housing 321 (331) is integrally and rotatably connected to a cam pulley 323 (333) which is rotated in synchronism with the crankshaft. The rotor 322 (332) is integrally and rotatably connected to the camshaft 18 (19) which opens and closes the intake valve 14 (exhaust valve 15). The housing 321 (331) is internally formed with retarded angle hydraulic chambers 325 (335) and advanced angle hydraulic chambers 326 (336) which are defined by vanes 324 (334) formed on the rotor 322 (332), and the inner surface of the housing 321 (331). The VVT 32 and the VVT 33 correspond to a valve characteristic control device in the claims.

Figure 4:
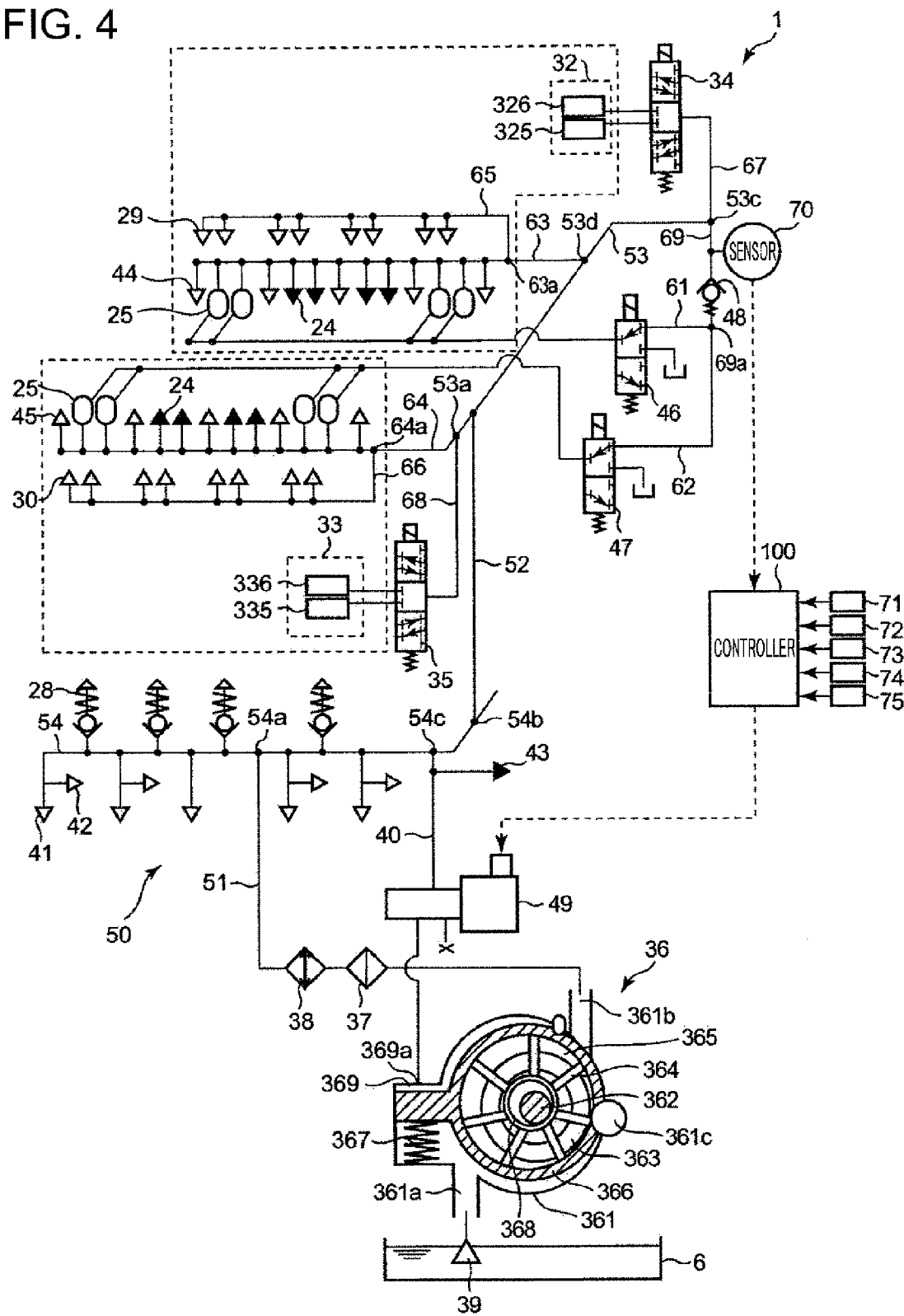
FIG. 4 is a diagram illustrating a schematic configuration of an oil supply device.

As illustrated in FIG. 4, oil to be supplied from a pump (an oil pump) 36 via a first direction switching valve 34 is introduced to each of the hydraulic chambers 325 and 326 of the VVT 32. Likewise, oil to be supplied from the pump 36 via a first direction switching valve 35 is introduced from each of the hydraulic chambers 335 and 336 of the VVT 33. When oil is introduced to the retarded angle hydraulic chambers 325 (335) by control of the first direction switching valve 34 (35), the camshaft 18 (19) is rotated in a direction opposite to the rotating direction thereof by a hydraulic pressure. As a result, the opening and closing timings of the intake valve 14 (exhaust valve 15) are retarded. On the other hand, when oil is introduced to the advanced angle hydraulic chambers 326 (336), the camshaft 18 (19) is rotated in the same direction as the rotating direction thereof by a hydraulic pressure. As a result, the opening and closing timings of the intake valve 14 (exhaust valve 15) are advanced.

Figure 3B:
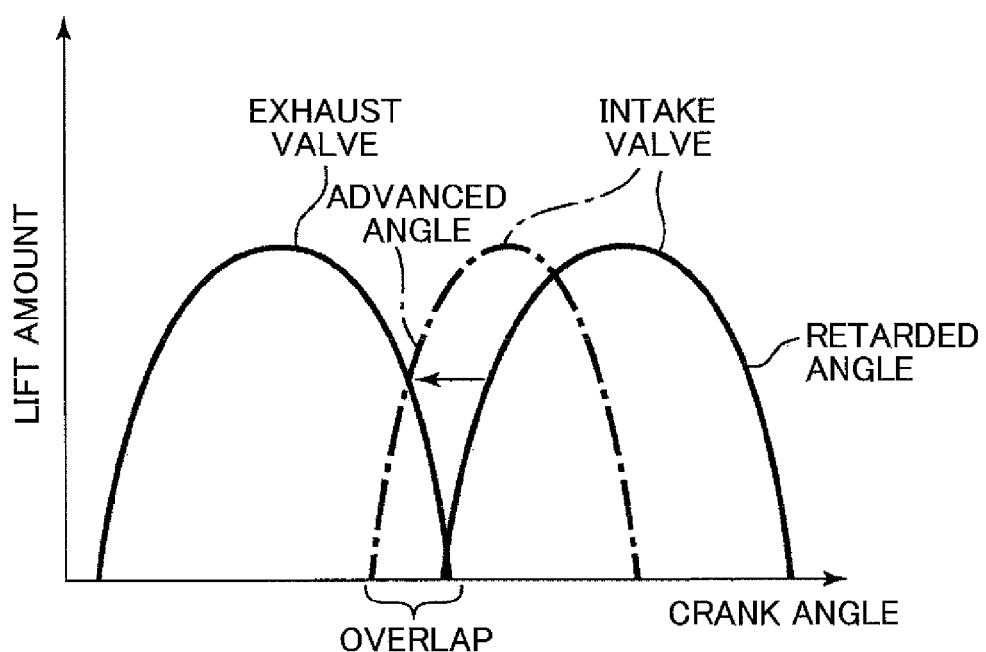
FIG. 3B is a diagram for describing an operation of VVT.

FIG. 3B illustrates lift curves of an intake valve 14 and an exhaust valve 15, as well as a case, in which opening and closing timings of the intake valve 14 are changed by the VVT 32. As is understood from FIG. 3B, when opening and closing timings of the intake valve 14 are changed in the advanced angle direction (see the arrow in FIG. 3B) by the VVT 32, the opening period of the exhaust valve 15 and the opening period of the intake valve 14 (see the one-dotted chain line in FIG. 3B) overlap each other. In this way, overlapping the opening periods of the intake valve 14 and the exhaust valve 15 makes it possible to increase the internal EGR amount at the time of engine combustion, and to increase the fuel economy by reducing a pumping loss. Further, it is also possible to lower the combustion temperature. This is advantageous in reducing NOx emissions for purification of exhaust gas. On the other hand, when the opening and closing timings of the intake valve 14 are changed in the retarded angle direction by the VVT 32, the opening period of the exhaust valve 15 and the opening period of the intake valve 14 (see the solid line in FIG. 3B) do not overlap each other. This makes it possible to secure stable combustion when the engine is in an idling condition, and to enhance the engine output when the engine is in a high speed condition.

Next, the oil supply device 1 in the embodiment of the invention is described in detail referring to FIG. 4. As illustrated in FIG. 4, the oil supply device 1 in the embodiment is a device for supplying oil to the engine 2. The oil supply device 1 is provided with the pump 36, and an oil supply path 50 connected to the pump 36 and configured to guide pressure-increased oil to each part of the engine.

The oil supply path 50 is constituted of passages formed in various parts such as a pipe, the cylinder block 5, and the cylinder head 4. The oil supply path 50 includes a first communication passage 51 communicating with the pump 36, and extending from the oil pan 6 to a branch part 54a in the cylinder block 5; the main gallery 54 extending in the cylinder array direction within the cylinder block 5; a second communication passage 52 extending from a branch part 54b of the main gallery 54 to the cylinder head 4; a third communication passage 53 extending substantially horizontally between the intake side and the exhaust side within the cylinder head 4; and a plurality of oil paths 61 to 69 branching from the third communication passage 53 within the cylinder head 4.

The pump 36 is a well-known oil pump of a variable capacity type, and is driven by rotating the unillustrated crankshaft. The pump 36 is provided with a housing 361 which is constituted of a pump body having a U-shape in section and including a pump accommodation chamber whose one end is opened and which has a columnar space inside, and a cover member for covering the opening of the pump body; a driving shaft 362 which is rotatably supported on the housing 361, and which is driven to rotate by the crankshaft while passing through substantially the center of the pump accommodation chamber; a pump element constituted of a rotor 363 which is rotatably accommodated in the pump accommodation chamber and whose central portion is connected to the driving shaft, and vanes 364 which are projectably and retractably housed in radially cut slits in the outer periphery of the rotor 363; a cam ring 366 which is eccentrically disposed with respect to the center of rotation of the rotor 363 on the outer peripheral side of the pump element, and which defines a pump chamber 365, as hydraulic oil chambers, in cooperation with the rotor 363 and with the vanes 364 adjacent to each other; a spring 367, as an urging member, which is housed in the pump body, and which is configured to constantly urge the cam ring 366 in such a direction as to increase the eccentric amount of the cam ring 366 with respect to the center of rotation of the rotor 363; and a pair of ring members 368 which are slidably disposed on inner peripheral side portions of the rotor 363 and which have a diameter smaller than the diameter of the rotor 363. The housing 361 is formed with a suction port 361a for supplying oil to the pump chamber 365 formed inside the housing 361, and a discharge port 361b for discharging oil from the pump chamber 365. The housing 361 is internally formed with a pressure chamber 369 which is defined by the inner surface of the housing 361 and the outer surface of the cam ring 366. An inlet hole 369a opening toward the pressure chamber 369 is formed in the pressure chamber 369. The pump 36 is configured such that introducing oil into the pressure chamber 369 through the inlet hole 369a makes it possible to swing the cam ring 366 around a pivot 361c, whereby the rotor 363 is eccentrically rotated with respect to the cam ring 366, and the discharge capacity of the pump 36 is increased.

An oil strainer 39 facing the oil pan 6 is connected to the suction port 361a of the pump 36. The first communication passage 51 communicating with the discharge port 361b of the pump 36 is provided with an oil filter 37 and an oil cooler 38 in this order from upstream toward downstream. Oil stored in the oil pan 6 is pumped up by the pump 36 through the oil strainer 39, is filtered through the oil filter 37, is cooled in the oil cooler 38, and then is introduced to the main gallery 54 within the cylinder block 5.

The main gallery 54 communicates with each of the oil jets 28 for injecting cooling oil onto the back surfaces of the four pistons 8, an oil supply portion 41 for supplying oil to metal bearings disposed for five main journal bearings which pivotally support the crankshaft, and an oil supply portion 42 for supplying oil to metal bearings disposed on crankpins of the crankshaft which rotatably connect between four connecting rods. Oil is constantly supplied to the main gallery 54.

An oil supply portion 43 for supplying oil to a hydraulic chain tensioner, and an oil path 40 for supplying oil from the pressure chamber 369 of the pump 36 to the inlet hole 369a via a linear solenoid valve 49 are formed in this order at a position downstream of a branch part 54c of the main gallery 54.

The oil path 68 branching from a branch part 53a of the third communication passage 53 communicates with the advanced angle hydraulic chambers 336 and the retarded angle hydraulic chambers 335 of the VVT 33 for changing the opening and closing timings of the exhaust valve 15 via the first direction switching valve 35 on the exhaust side. Operating the first direction switching valve 35 makes it possible to supply oil to either one of the advanced angle hydraulic chambers 336 and the retarded angle hydraulic chambers 335. The oil path 66 branching from a branch part 64a of the oil path 64 communicates with the oil shower 30 for supplying lubricant oil to the swing arm 21 on the exhaust side. Oil is constantly supplied to the oil path 66. The oil path 64 communicates with each of an oil supply portion 45 (see the hollow triangular portion in FIG. 4) for supplying oil to a metal bearing disposed on a cam journal bearing of the cam shaft 19 on the exhaust side, the HLA 24 (see the solid triangular portion in FIG. 4), and the HLA 25 provided with a valve stop function (see the hollow elliptical portion in FIG. 4). Oil is constantly supplied to the oil path 64.

The structure of the oil supply device 1 on the intake side is the same as described above. Specifically, the oil path 67 branching from a branch part 53c of the third communication passage 53 communicates with the advanced angle hydraulic chambers 326 and the retarded angle hydraulic chambers 325 of the VVT 32 for changing the opening and closing timings of the intake valve 14 via the first direction switching valve 34 on the intake side. The oil path 65 branching from a branch part 63a of the oil path 63 communicates with the oil shower 29 for supplying lubricant oil to the swing arm 20 on the intake side. The oil path 63 branching from a branch part 53d of the third communication passage 53 communicates with each of an oil supply portion 44 (see the hollow triangular portion in FIG. 4) for supplying oil to a metal bearing disposed on a cam journal bearing of the cam shaft 18 on the intake side, the HLA 24 (see the solid triangular portion in FIG. 4), and the HLA 25 provided with a valve stop function (see the hollow elliptical portion in FIG. 4).

Further, a check valve 48 for controlling oil to flow only in one direction from upstream toward downstream is provided in the oil path 69 branching from the branch part 53c of the third communication passage 53. The oil path 69 is branched from a branch part 69a formed downstream of the check valve 48. The oil path 69 communicates with each of the valve stop mechanism 25b of the HLA 25 on the intake side via a second direction switching valve 46 on the intake side and via the oil path 61, and the valve stop mechanism 25b of the HLA 25 on the exhaust side via a second direction switching valve 47 on the exhaust side and via the oil path 62. Operating the second direction switching valves 46 and 47 makes it possible to supply oil to each of the valve stop mechanisms 25b. Further, a hydraulic pressure sensor 70 for detecting a hydraulic pressure is provided between the check valve 48 in the oil path 69, and the branch part 53c. The hydraulic pressure sensor 70 corresponds to a hydraulic pressure detecting unit in the claims.

After cooling and lubricating, lubricant oil and cooling oil supplied to the metal bearings which rotatably support the crankshaft and the camshafts 18 and 19, the oil jets 28, and the oil showers 29 and 30 are drained to the oil pan 6 through an unillustrated drain oil path for refluxing.

An operating condition of the engine is detected by various sensors. For instance, a rotation angle of the crankshaft is detected by a crank position sensor 71. An engine rotation speed is calculated based on a detection signal indicating the detected rotation angle. An opening degree of a throttle valve is detected by a throttle position sensor 72. An engine load is calculated based on a detection signal indicating the detected opening degree. A temperature and a pressure of engine oil are respectively detected by an oil temperature sensor 73 and the hydraulic pressure sensor 70. Rotation phases of the camshafts 18 and 19 are detected by a cam angle sensor 74 disposed near the camshafts 18 and 19. Operation angles of the VVTs 32 and 33 are detected based on detection signals indicating the detected rotation phases. Further, a temperature of cooling water for cooling the engine 2 is detected by a water temperature sensor 75.

A controller 100 is constituted of a microcomputer. The controller 100 is provided with a signal input unit for inputting a detection signal from various sensors (such as the crank position sensor 71, the throttle position sensor 72, the oil temperature sensor 73, and the hydraulic pressure sensor 70), an arithmetic unit for performing an arithmetic operation relating to control, a signal output unit for outputting a control signal to a device to be controlled (such as the first direction switching valves 34 and 35, the second direction switching valves 46 and 47, and the linear solenoid valve 49), and a storage unit which stores programs and data necessary for control (such as hydraulic pressure control maps and duty ratio maps to be described later).

The linear solenoid valve 49 is a valve for controlling a discharge amount from the pump 36 depending on an operating condition of the engine. Oil is supplied to the pressure chamber 369 of the pump 36 when the linear solenoid valve 49 is opened. The controller 100 controls a discharge amount (a flow rate) of the pump 36 by driving the linear solenoid valve 49. Specifically, the controller 100 has a function as a pump control unit in the claims. The configuration of the linear solenoid valve 49 itself is well-known. Therefore, detailed description on the linear solenoid valve 49 is omitted herein.

Figure 5:
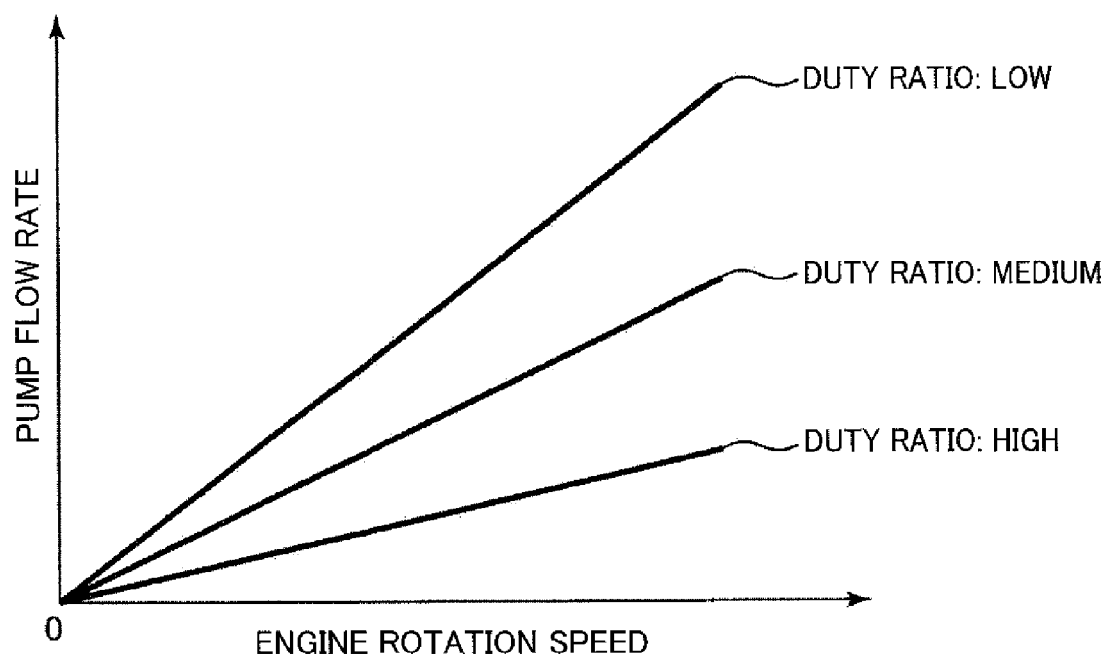
FIG. 5 is a diagram illustrating characteristics of an oil pump of a variable capacity type.

Specifically, the linear solenoid valve 49 is driven in response to a control signal indicating a duty ratio, which is transmitted from the controller 100 based on an operating condition of the engine 2, and a hydraulic pressure to be supplied to the pressure chamber 369 of the pump 36 is controlled. By application of the hydraulic pressure to the pressure chamber 369, the eccentric amount of the cam ring 366 is controlled for adjusting the amount of change in the internal volume of the pump chamber 365. This makes it possible to control the discharge amount (the flow rate) of the pump 36. In other words, the capacity of the pump 36 is controlled by the duty ratio. The pump 36 is driven by the crankshaft of the engine 2. Therefore, as illustrated in FIG. 5, the flow rate (the discharge amount) of the pump 36 is proportional to the engine rotation speed. When the duty ratio indicates a ratio of an energization time of the linear solenoid valve with respect to a period of time corresponding to one cycle, as illustrated in FIG. 5, as the duty ratio increases, the hydraulic pressure to be applied to the pressure chamber 369 of the pump 36 increases. As a result, the gradient representing the flow rate of the pump 36 with respect to the engine rotation speed decreases.

Further, the controller 100 controls the VVTs 32 and 33 by driving the first direction switching valves 34 and 35, and controls the HLA 25 provided with a valve stop function (the valve stop mechanism 25b) by driving the second direction switching valves 46 and 47. Specifically, the controller 100 has a function as a valve control unit in the claims.

Figure 6A:
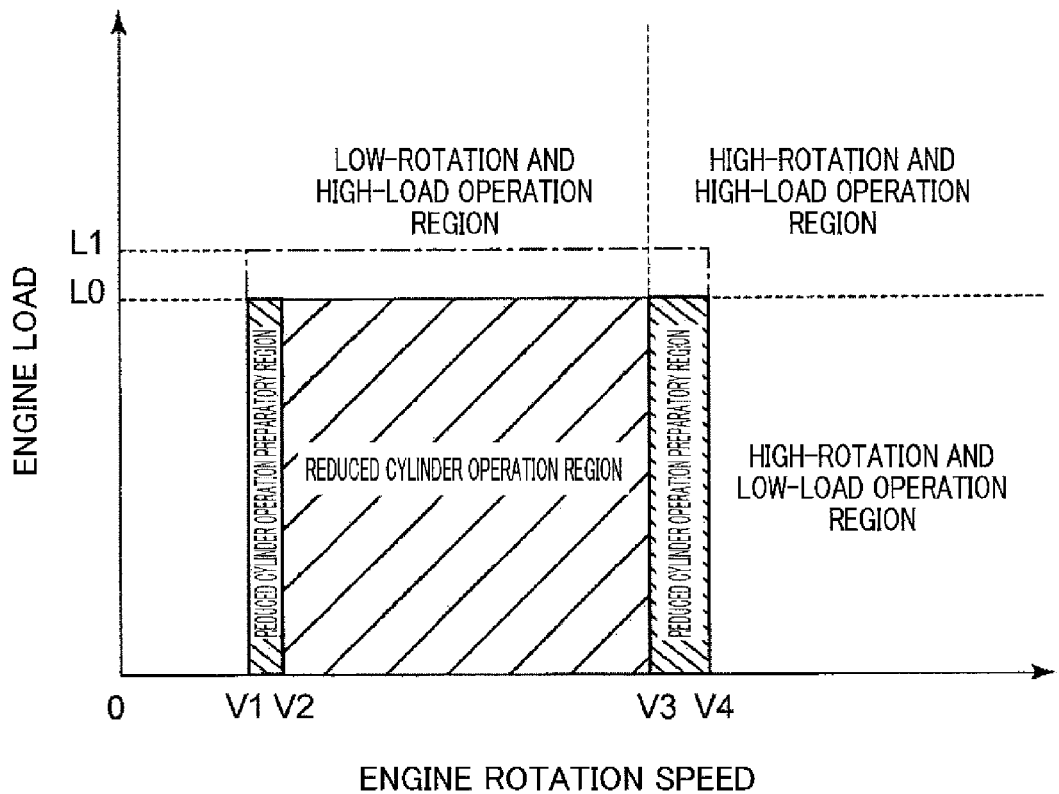
FIG. 6A is a conceptual diagram illustrating a reduced cylinder operation region of the engine in terms of a relationship with respect to engine load and rotation speed.
Figure 6B:
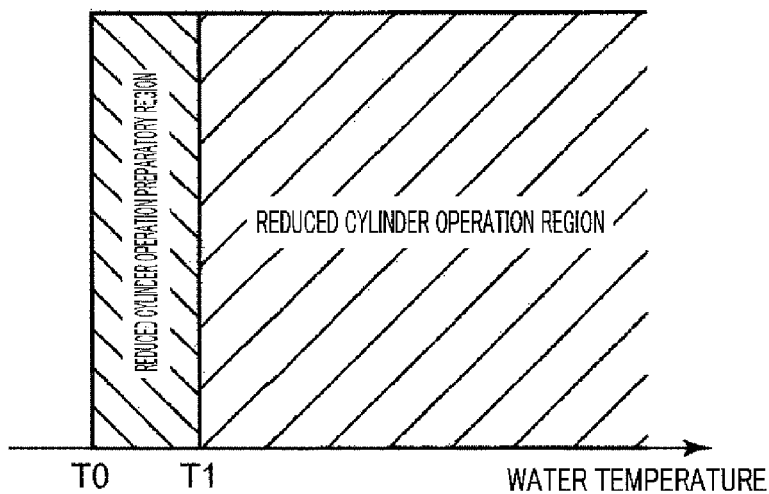
FIG. 6B is a conceptual diagram illustrating the reduced cylinder operation region of the engine in terms of a relationship with respect to a water temperature of the engine.

Next, a reduced cylinder operation of the engine is described referring to FIG. 6A and FIG. 6B. A reduced cylinder operation and an all cylinder operation of the engine are switched depending on an operating condition of the engine. Specifically, when the operating condition of the engine to be estimated from an engine rotation speed, an engine load, and a cooling water temperature of the engine is in a reduced cylinder operation region illustrated in FIG. 6A and FIG. 6B, a reduced cylinder operation is executed. Further, as illustrated in FIG. 6A and FIG. 6B, a reduced cylinder operation preparatory region is provided adjacent to the reduced cylinder operation region. When the operating condition of the engine is in the reduced cylinder operation preparatory region, the hydraulic pressure is increased in advance toward a requested hydraulic pressure of the valve stop mechanism, as a preparatory operation for executing a reduced cylinder operation. When the operating condition of the engine is out of the reduced cylinder operation region and the reduced cylinder operation preparatory region, an all cylinder operation is executed.

Referring to FIG. 6A, for instance, when the engine is accelerated at a predetermined engine load to increase the engine rotation speed, an all cylinder operation is performed when the engine rotation speed is lower than V1, a preparatory operation for a reduced cylinder operation is performed when the the engine rotation speed is not lower than V1 but lower than V2, and a reduced cylinder operation is performed when the engine rotation speed is equal to or higher than V2. Further, for instance, when the engine is decelerated at a predetermined engine load to reduce the engine rotation speed, an all cylinder operation is performed when the engine rotation speed is equal to or higher than V4, a preparatory operation for a reduced cylinder operation is performed when the engine rotation speed is not lower than V3 but lower than V4, and a reduced cylinder operation is performed when the engine rotation speed is equal to or lower than V3.

Referring to FIG. 6B, for instance, when the engine is warmed up and the cooling water temperature is increased by driving of the engine at a predetermined engine rotation speed and at a predetermined engine load, an all cylinder operation is performed when the water temperature is lower than T0, a preparatory operation for a reduced cylinder operation is performed when .the water temperature is not lower than T0 but lower than T1, and a reduced cylinder operation is performed when the water temperature is equal to or higher than T1.

If the reduced cylinder operation preparatory region is not provided, when the operating condition of the engine is switched from an all cylinder operation to a reduced cylinder operation, it is necessary to increase the hydraulic pressure until a requested hydraulic pressure of the valve stop mechanism after the operating condition of the engine falls in the reduced cylinder operation region. This control, however, shortens the time for the reduced cylinder operation, because the time for the reduced cylinder operation is shortened by the time required for the hydraulic pressure to reach the requested hydraulic pressure. This may lower the fuel efficiency of the engine.

Figure 7A:
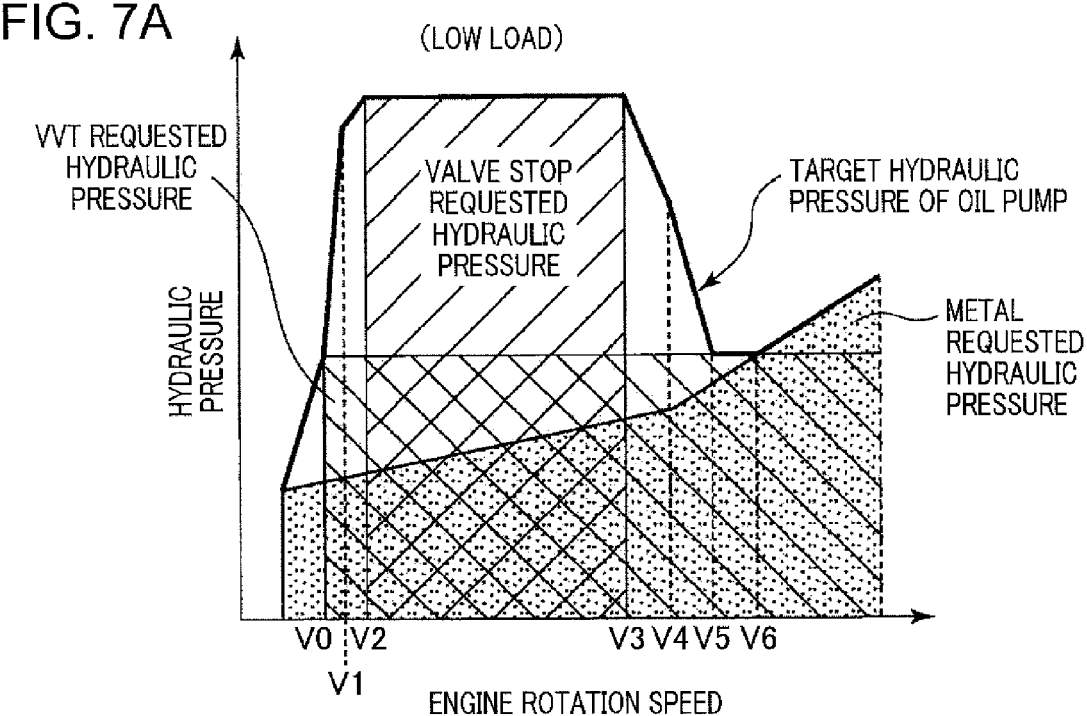
FIG. 7A is a diagram describing setting a target hydraulic pressure of a pump when the engine is in a low load condition.

In view of the above, in the embodiment, a reduced cylinder operation preparatory region is provided adjacent to a reduced cylinder operation region in order to maximally increase the fuel efficiency of the engine. Further, the hydraulic pressure is increased in advance in the reduced cylinder operation preparatory region, and a target hydraulic pressure map (see. FIG. 7A) is set in order to eliminate a loss of time required for the hydraulic pressure to reach the requested hydraulic pressure.

As illustrated in FIG. 6A, a region indicated by the one-dotted chain line, which is adjacent to the engine high load side with respect to the reduced cylinder operation region may be set as a reduced cylinder operation preparatory region. In this configuration, for instance, when the engine load is lowered at a predetermined engine rotation speed, an all cylinder operation is performed when the engine load is L1 (>L0) or higher, a preparatory operation for a reduced cylinder operation is performed when the engine load is not lower than L0 but lower than L1, and a reduced cylinder operation is performed when the engine load is equal to or lower than L0.

Figure 7B:
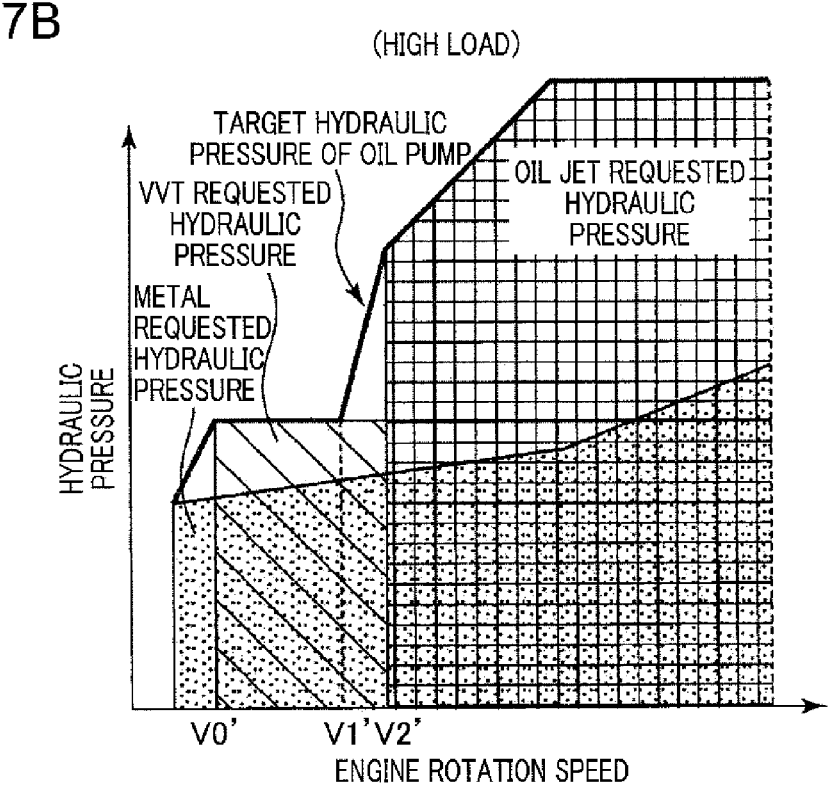
FIG. 7B is a diagram describing setting a target hydraulic pressure of a pump when the engine is in a high load condition.

Next, a requested hydraulic pressure of each of the hydraulically operated devices and a target hydraulic pressure of the pump 36 are described referring to FIG. 7A and FIG. 7B. The oil supply device 1 in the embodiment is configured such that oil is supplied to two or more hydraulically operated devices by one pump 36, and a requested hydraulic pressure required by each of the hydraulically operated devices is changed depending on an operating condition of the engine. In view of the above, in order to obtain a requested hydraulic pressure for all the hydraulically operated devices in all the operating conditions of the engine, the pump 36 is required to set a hydraulic pressure equal to or higher than a highest requested hydraulic pressure out of the requested hydraulic pressures of the hydraulically operated devices to a target hydraulic pressure in each of the operating conditions of the engine. Therefore, in the embodiment, a target hydraulic pressure may be set to satisfy the requested hydraulic pressures of the valve stop mechanisms 25b, the oil jets 28, the metal bearings such as journal bearings of the crankshaft, and the VVTs 32 and 33, whose requested hydraulic pressures are relatively high among all the hydraulically operated devices. This is because setting a target hydraulic pressure as described above makes it possible to satisfy the requested hydraulic pressures of the other hydraulically operated devices, whose requested hydraulic pressures are relatively low.

Referring to FIG. 7A, when the engine is in a low load condition, the hydraulically operated devices whose requested hydraulic pressures are relatively high are the VVTs 32 and 33, the metal bearings, and the valve stop mechanisms 25b. The requested hydraulic pressures of these hydraulically operated devices are changed depending on an operating condition of the engine. For instance, the requested hydraulic pressure of the VVTs 32 and 33 (hereinafter, called as a VVT requested hydraulic pressure) is substantially constant when the engine rotation speed is equal to or higher than a predetermined engine rotation speed (V0). The requested hydraulic pressure of the metal bearing (hereinafter, called as a metal requested hydraulic pressure) increases, as the engine rotation speed increases. The requested hydraulic pressure of the valve stop mechanism 25b (hereinafter, called as a valve stop requested hydraulic pressure) is substantially constant when the engine rotation speed is within a predetermined engine rotation speed range (from V2 to V3). Comparing the requested hydraulic pressures with respect to each of the engine rotation speeds, when the engine rotation speed is equal to or lower than V0, the metal requested hydraulic pressure is the only one requested hydraulic pressure. When the engine rotation speed is from V0 to V2, the VVT requested hydraulic pressure is highest. When the engine rotation speed is from V2 to V3, the valve stop requested hydraulic pressure is highest. When the engine rotation speed is from V3 to V6, the VVT requested hydraulic pressure is highest. When the engine rotation speed is equal to or higher than V6, the metal requested hydraulic pressure is highest. Thus, it is necessary to set the aforementioned highest requested hydraulic pressure to a target hydraulic pressure of the pump 36 as a reference target hydraulic pressure with respect to each of the engine rotation speeds.

When the engine rotation speed is in the engine rotation speed range (from V1 to V2, or from V3 to V4), which is one-step lower than or one-step higher than the engine rotation speed range (from V2 to V3) in which a reduced cylinder operation is performed, it is necessary to increase a target hydraulic pressure in advance until the valve stop requested hydraulic pressure in order to prepare for a reduced cylinder operation. In view of the above, the target hydraulic pressure is corrected to be higher than the reference target hydraulic pressure when the engine rotation speed is in the aforementioned engine rotation speed range (from V1 to V2, or from V3 to V4). According to this configuration, as described above using FIG. 6A, it is possible to eliminate a loss of time required for the hydraulic pressure to reach the valve stop requested hydraulic pressure when the engine rotation speed reaches the engine rotation speed range in which a reduced cylinder operation is performed. This is advantageous in increasing the fuel efficiency of the engine. In FIG. 7A, the bold line representing the engine rotation speed range of from V1 to V2, and the bold line representing the engine rotation speed range of from V3 to V4 indicate a target hydraulic pressure (a corrected hydraulic pressure) of the oil pump, whose target hydraulic pressure is increased by the aforementioned correction.

Further, it is desirable to set a change in the target hydraulic pressure with respect to the engine rotation speed to be small, taking into consideration a response delay of the pump 36 or an overload of the pump 36. In view of the above, in the embodiment, the target hydraulic pressure is corrected to be higher than the reference target hydraulic pressure in the rotation speed range, which is adjacent to the engine rotation speed ranges (from V1 to V2, and from V3 to V4) in which a preparatory operation for a reduced cylinder operation is performed, as well as the engine rotation speed ranges, in which a preparatory operation for a reduced cylinder operation is performed. Specifically, in the embodiment, the target hydraulic pressure in each of the engine rotation speed ranges of V0 or lower, of from V0 to V1, and of from V4 to V5 is corrected to be higher than the reference target hydraulic pressure in order to minimize a change in the hydraulic pressure at the engine rotation speed (e.g. V0, V1, and V4) at which the requested hydraulic pressure is likely to change sharply with respect to the engine rotation speed (in other words, in order to gradually increase or decrease the hydraulic pressure, as the engine rotation speed is changed). In FIG. 7A, the bold line representing the engine rotation speed range of V0 or lower, the bold line representing the engine rotation speed range of from V0 to V1, and the bold line representing the engine rotation speed range of from V4 to V5 indicate a target hydraulic pressure of the oil pump, whose target hydraulic pressure is increased by the aforementioned correction.

Referring to FIG. 7B, when the engine is in a high load condition, the hydraulically operated devices whose requested hydraulic pressures are relatively high are the VVTs 32 and 33, the metal bearings, and the oil jets 28. As well as the case of the low load condition, the requested hydraulic pressures of these hydraulically operated devices are changed depending on an operating condition of the engine. For instance, the VVT requested hydraulic pressure is substantially constant when the engine rotation speed is equal to or higher than a predetermined engine rotation speed (V0'). The metal requested hydraulic pressure increases, as the engine rotation speed increases. Further, the requested hydraulic pressure of the oil jet 28 increases as the engine rotation speed increases until the engine rotation speed reaches a predetermined engine rotation speed, and is constant after the engine rotation speed exceeds the predetermined engine rotation speed.

As well as the case of the low load condition, when the engine is in the high load condition, it is preferable to correct the target hydraulic pressure to be higher than the reference target hydraulic pressure when the engine rotation speed is near the engine rotation speed (e.g. V0' or V2') at which the requested hydraulic pressure is likely to change sharply with respect to the engine rotation speed. In FIG. 7B, the bold line representing the engine rotation speed range of V0' or lower, and the bold line representing the engine rotation speed range of from V1' to V2' indicate a target hydraulic pressure of the oil pump, whose target hydraulic pressure is increased by the aforementioned correction.

The illustrated target hydraulic pressure of the oil pump is changed in the form of a line graph. Alternatively, the target hydraulic pressure may be smoothly changed in the form of a curve. Further, in the embodiment, the target hydraulic pressure is set based on the requested hydraulic pressures of the valve stop mechanism 25b, the oil jets 28, the metal bearings, and the VVTs 32 and 33, whose requested hydraulic pressures are relatively high. The hydraulically operated devices for which a target hydraulic pressure is set are not limited to the aforementioned devices. As far as a hydraulically operated device has a relatively high requested hydraulic pressure, it is possible to set a target hydraulic pressure, taking into consideration the requested hydraulic pressure.

Figure 8A:
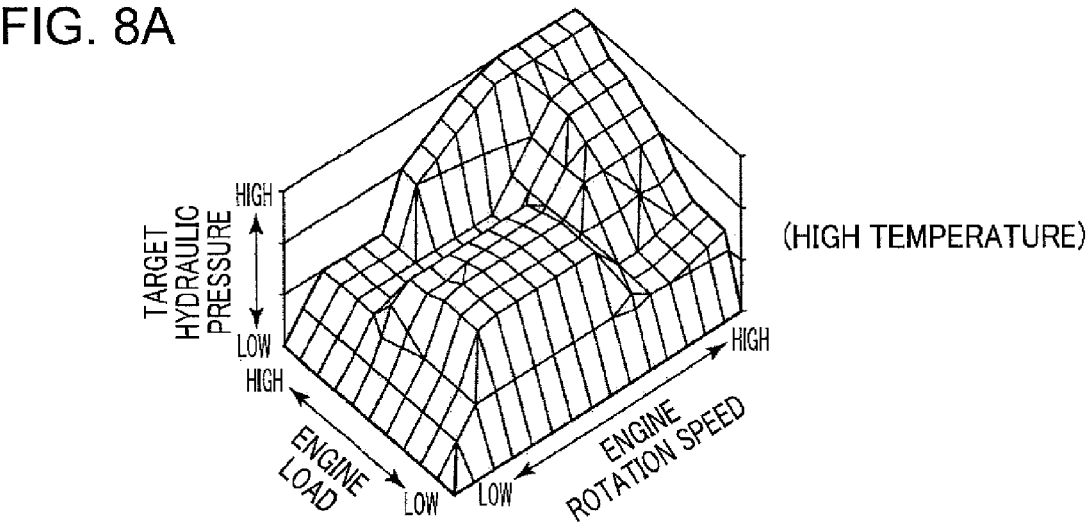
FIG. 8A is a diagram illustrating a hydraulic pressure control map to be used when the engine is in a high temperature state.
Figure 8B:
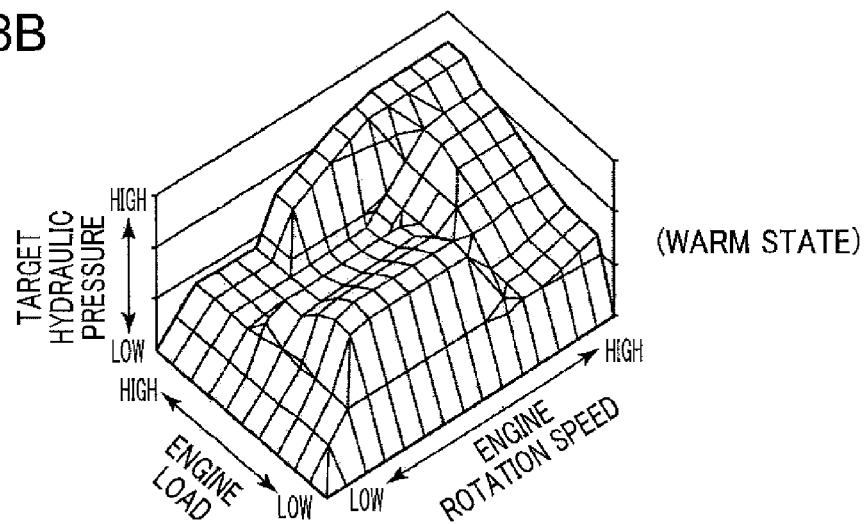
FIG. 8B is a diagram illustrating a hydraulic pressure control map to be used when the engine is in a warm state.
Figure 8C:
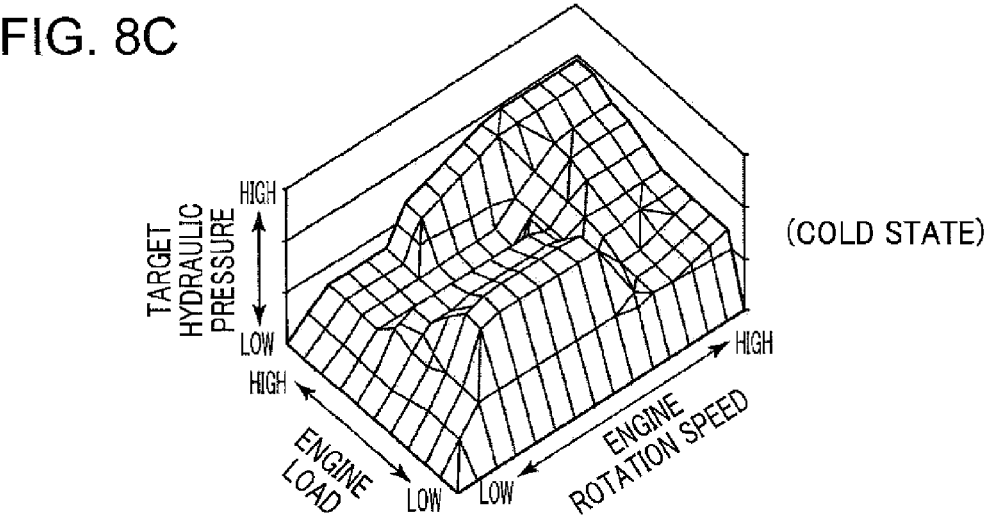
FIG. 8C is a diagram illustrating a hydraulic pressure control map to be used when the engine is in a cold state.

Next, hydraulic pressure control maps are described referring to FIGS. 8A to 8C. The target hydraulic pressures of the oil pump illustrated in FIG. 7A and FIG. 7B are based on an engine rotation speed as a parameter. The hydraulic pressure control maps illustrated in FIGS. 8A to 8C are hydraulic pressure control maps, in which target hydraulic pressures of the oil pump are expressed as a three-dimensional graph, using an engine load and an oil temperature as parameters, as well as an engine rotation speed. Specifically, the hydraulic pressure control maps are such that a target hydraulic pressure is set in advance based on a highest requested hydraulic pressure out of the requested hydraulic pressures of the hydraulically operated devices with respect to each of the operating conditions of the engine (an engine rotation speed, an engine load, and an oil temperature).

FIG. 8A, FIG. 8B, and FIG. 8C respectively illustrate hydraulic pressure control maps when the engine (the oil temperature) is in a high temperature state, is in a warm state, and is in a cold state. The controller 100 selectively uses the hydraulic pressure control maps depending on an oil temperature of oil. Specifically, when the engine is started and the engine is in a cold state (when the oil temperature is lower than T1), the controller 100 reads a target hydraulic pressure associated with the operating condition of the engine (an engine rotation speed and an engine load), based on the hydraulic pressure control map to be used when the engine is in a cold state, as illustrated in FIG. 8C. When the engine is warmed up and the oil temperature reaches a predetermined oil temperature T1 or higher, the controller 100 reads a target hydraulic pressure based on the hydraulic pressure control map to be used when the engine is in a warm state, as illustrated in FIG. 8B. Further, when the engine is completely warmed up and the oil temperature reaches a predetermined oil temperature T2 (>T1) or higher, the controller 100 reads a target hydraulic pressure based on the hydraulic pressure control map to be used when the engine is in a high temperature state, as illustrated in FIG. 8A.

In the embodiment, a target hydraulic pressure is read by dividing the oil temperatures into three temperature ranges to be used when the engine is in a high temperature state, is in a warm state, and is in a cold state, and by using the hydraulic pressure control maps which are set in advance with respect to the three temperature ranges. Alternatively, the number of temperature ranges of oil temperature may be increased, and a larger number of hydraulic pressure control maps may be prepared. Further, when a temperature range (T1≤t<T2) to which a certain hydraulic pressure control map (e.g. the hydraulic pressure control map to be used when the engine is in a warm state) is applied includes the oil temperature t, the controller 100 reads a target hydraulic pressure of one value. Alternatively, the controller 100 may read a target hydraulic pressure, as the oil temperature changes. For instance, assuming that the target hydraulic pressure when the oil temperature is T1 is P1, the target hydraulic pressure when the oil temperature is T2 is P2, and the target hydraulic pressure when the oil temperature is t (where t is a value between T1 and T2) is p, it is possible to calculate the target hydraulic pressure p by a proportional conversion equation: $p=P1+(t-T1)\times(P2-P1)/(T2-T1)$. Setting a target hydraulic pressure depending on an oil temperature in a precise manner as described above is advantageous in precisely controlling the pump capacity.

Figure 9A:
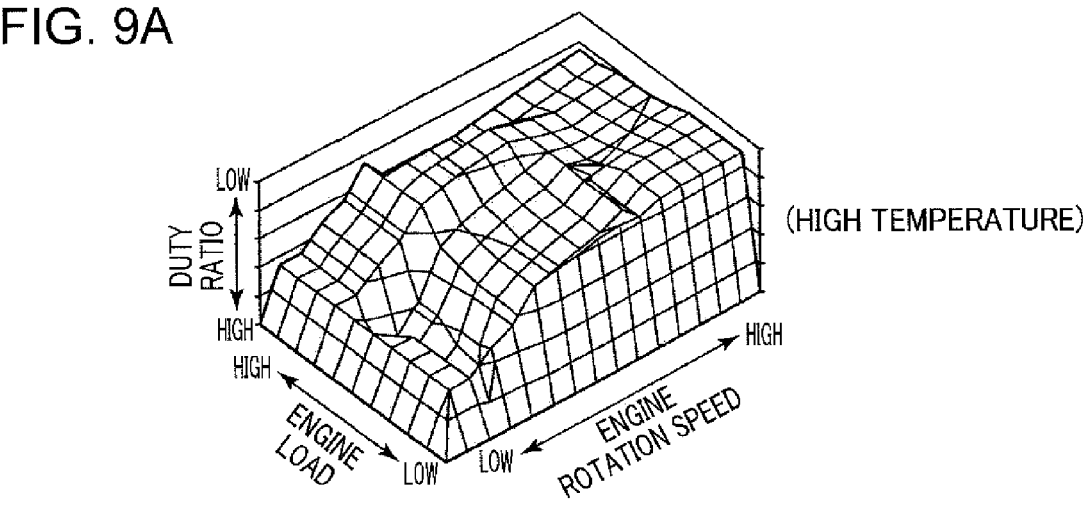
FIG. 9A is a diagram illustrating a duty ratio map to be used when the engine is in a high temperature state.
Figure 9B:
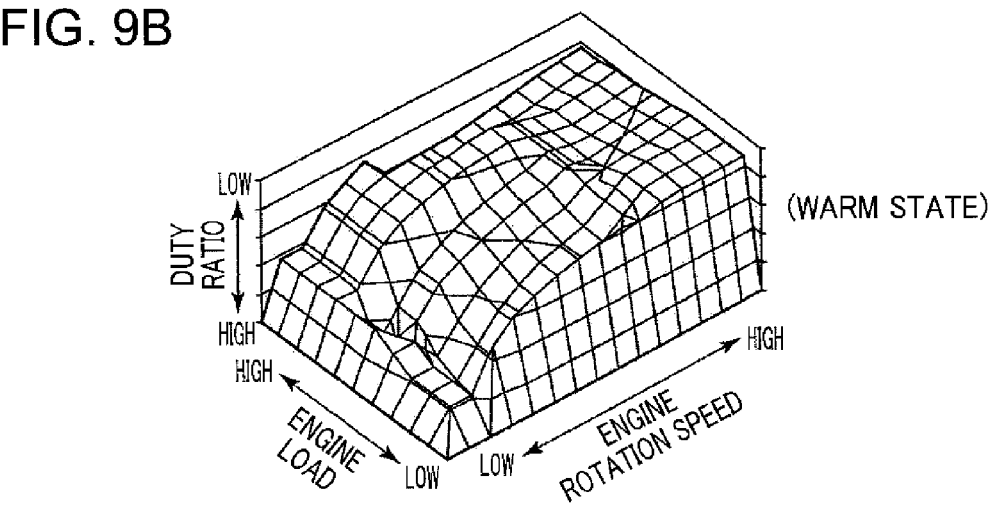
FIG. 9B is a diagram illustrating a duty ratio map to be used when the engine is in a warm state.
Figure 9C:
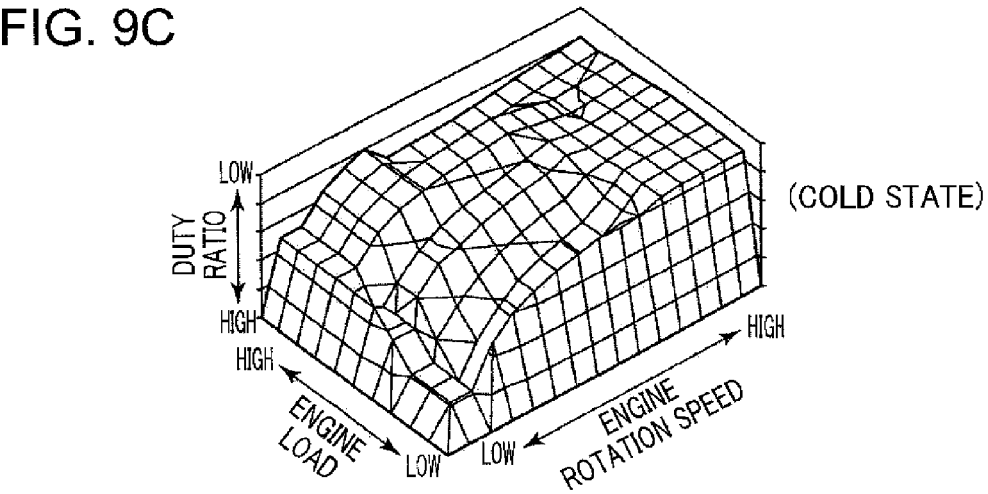
FIG. 9C is a diagram illustrating a duty ratio map to be used when the engine is in a cold state.

Next, duty ratio maps are described referring to FIGS. 9A to 9C. A duty ratio map is a map in which a target duty ratio is set with respect to each of the operating conditions of the engine. A target duty ratio is calculated by reading a target hydraulic pressure with respect to each of the operating conditions of the engine (an engine rotation speed, an engine load, and an oil temperature) from the aforementioned hydraulic pressure control maps, setting a target discharge amount of oil to be supplied from the pump 36, taking into consideration a flow path resistance of an oil path based on the read target hydraulic pressure, and taking into consideration the engine rotation speed (the rotation number of the oil pump) based on the set target discharge amount.

FIG. 9A, FIG. 9B, and FIG. 9C respectively illustrate duty ratio maps to be used when the engine (the oil temperature) is in a high temperature state, is in a warm state, and is in a cold state. The controller 100 selectively uses the duty ratio maps depending on the temperature of oil. Specifically, when the engine is started, the engine is in a cold state. Therefore, the controller 100 reads a duty ratio associated with an operating condition of the engine (an engine rotation speed and an engine load), based on the duty ratio map to be used when the engine is in a cold state, as illustrated in FIG. 9C. When the engine is warmed up and the oil temperature reaches the predetermined oil temperature T1 or higher, the controller 100 reads a target duty ratio based on the duty ratio map to be used when the engine is in a warm state, as illustrated in FIG. 9B. Further, when the engine is completely warmed up and the oil temperature reaches the predetermined oil temperature T2 (>T 1) or higher, the controller 100 reads a target duty ratio based on the duty ratio map to be used when the engine is in a high temperature state, as illustrated in FIG. 9A.

In the embodiment, a duty ratio is read by dividing the oil temperatures into three temperature ranges to be used when the engine is in a high temperature state, is in a warm state, and is in a cold state, and by using the duty ratio maps which are set in advance with respect to the three temperature ranges. Alternatively, as well as the aforementioned hydraulic pressure control maps, it is possible to prepare a larger number of duty ratio maps by dividing the oil temperatures into a larger number of temperature ranges. Further alternatively, it is possible to calculate a target duty ratio depending on an oil temperature, using proportional conversion. This is advantageous in precisely controlling the pump capacity.

Figure 10:
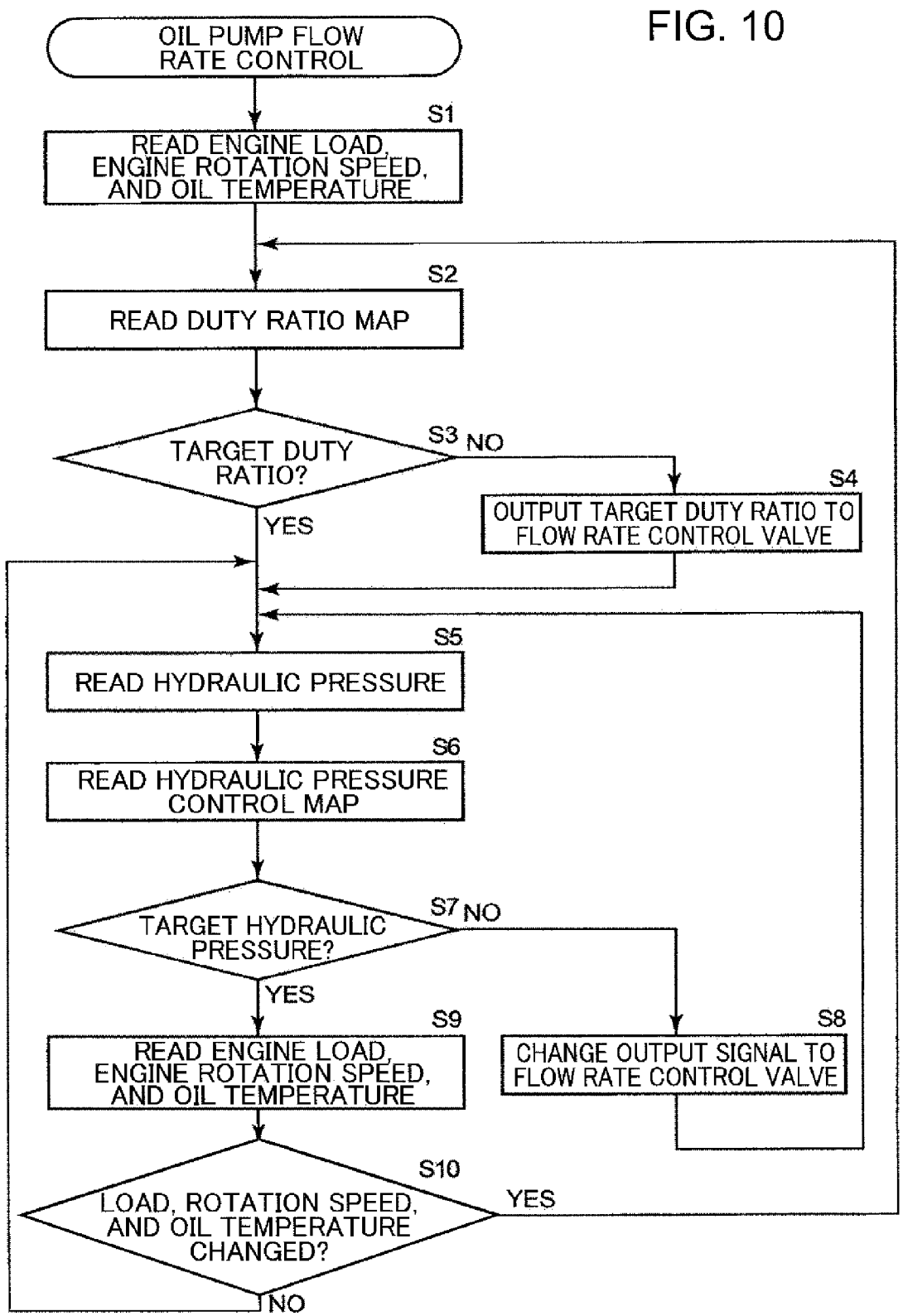
FIG. 10 is a flowchart illustrating a flow rate control method for a pump.

Next, a flow rate (discharge amount) control method of the pump 36 by the controller 100 is described in accordance with the flowchart of FIG. 10.

After the engine 2 is started, an engine load, an engine rotation speed, and an oil temperature are read from various sensors in order to know the operating condition of the engine 2 (in Step S1).

Subsequently, a duty ratio map stored in advance in the controller 100 is read, and a target duty ratio associated with the engine load, the engine rotation speed, and the oil temperature that are read in Step S1 is read (in Step S2).

Comparison is made between the target duty ratio read in Step S2, and a current duty ratio (in Step S3).

When it is determined that the current duty ratio reaches the target duty ratio in Step S3, the control proceeds to Step S5.

When it is determined that the current duty ratio does not reach the target duty ratio in Step S3, a control signal for making the current duty ratio to coincide with the target duty ratio is output to the linear solenoid valve 49 (in Step S4), and the control proceeds to Step S5.

Subsequently, a current hydraulic pressure is read from the hydraulic pressure sensor 70 (in Step S5).

Subsequently, a hydraulic control map stored in advance in the controller 100 is read, and a target hydraulic pressure associated with the current operating condition of the engine is read from the hydraulic pressure control map (in Step S6).

Comparison is made between the target hydraulic pressure read in Step S6, and the current hydraulic pressure (in Step S7).

When it is determined that the current hydraulic pressure does not reach the target hydraulic pressure in Step S7, a control signal for changing the target duty ratio of the linear solenoid valve 49 at a predetermined ratio is output (in Step S8), and the control returns to Step S5.

When it is determined that the current hydraulic pressure reaches the target hydraulic pressure in Step S7, the engine load, the engine rotation speed, and the oil temperature are read (in Step S9).

Lastly, it is determined whether the engine load, the engine rotation number, and the oil temperature have changed (in Step S10). When it is determined that these parameters have changed, the control returns to Step S2. On the other hand, when it is determined that these parameters remain unchanged, the control returns to Step S5. The aforementioned control is continued until the engine 2 is stopped.

The aforementioned flow rate control of the pump 36 is a combination of feed forward control of a duty ratio and feedback control of a hydraulic pressure. The aforementioned flow rate control makes it possible to concurrently enhance the responsiveness by feed forward control and enhance the precision by feedback control.

Figure 11:
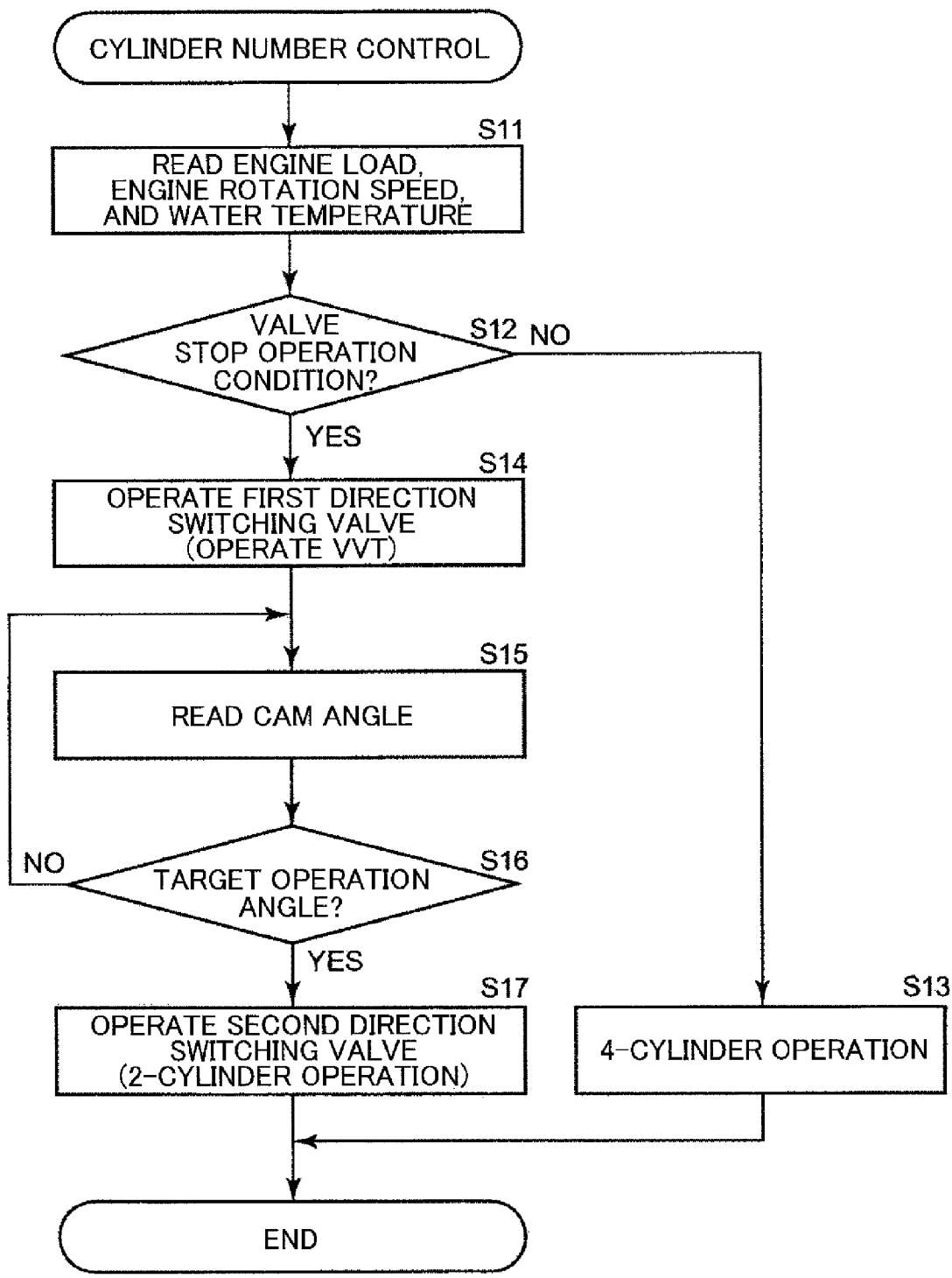
FIG. 11 is a flowchart illustrating a cylinder number control method for an engine.

Next, a cylinder number control method by the controller 100 is described in accordance with the flowchart of FIG. 11.

After the engine 2 is started, an engine load, an engine rotation speed, and a water temperature are read from various sensors in order to know the operating condition of the engine (in Step S11).

Subsequently, it is determined whether the current operating condition of the engine satisfies a valve stop operating condition (whether the operating condition of the engine is in a reduced cylinder operation region), based on the read engine load, engine rotation speed, and water temperature (in Step S12).

When it is determined that the valve stop operating condition is not satisfied (the operating condition of the engine is not in a reduced cylinder operation region) in Step S12, a four-cylinder operation is conducted (in Step S13).

When it is determined that the valve stop operating condition is satisfied in Step S12, the first direction switching valves 34 and 35 associated with the VVTs 32 and 33 are operated (in Step S14).

Subsequently, a current cam angle is read from the cam angle sensor 74 (in Step S15).

Subsequently, current operation angles of the VVTs 32 and 33 are calculated based on the read current cam angle, and it is determined whether the current operation angle reaches the target operation angle (in Step S16).

When it is determined that the current operation angles of VVTs 32 and 33 do not reach the target operation angle ($\theta1$) in Step S16, the control returns to Step S15. Specifically, operations of the second direction switching valves 46 and 47 (control of Step S17 to be described later) are prohibited until the current operation angles of the VVTs 32 and 33 reach the target operation angle.

When it is determined that the current operation angles reach the target operation angle in Step S16, the second direction switching valves 46 and 47 associated with the HLA 25 provided with a valve stop function are operated, and a two-cylinder operation is conducted (in Step S17).

Figure 12:
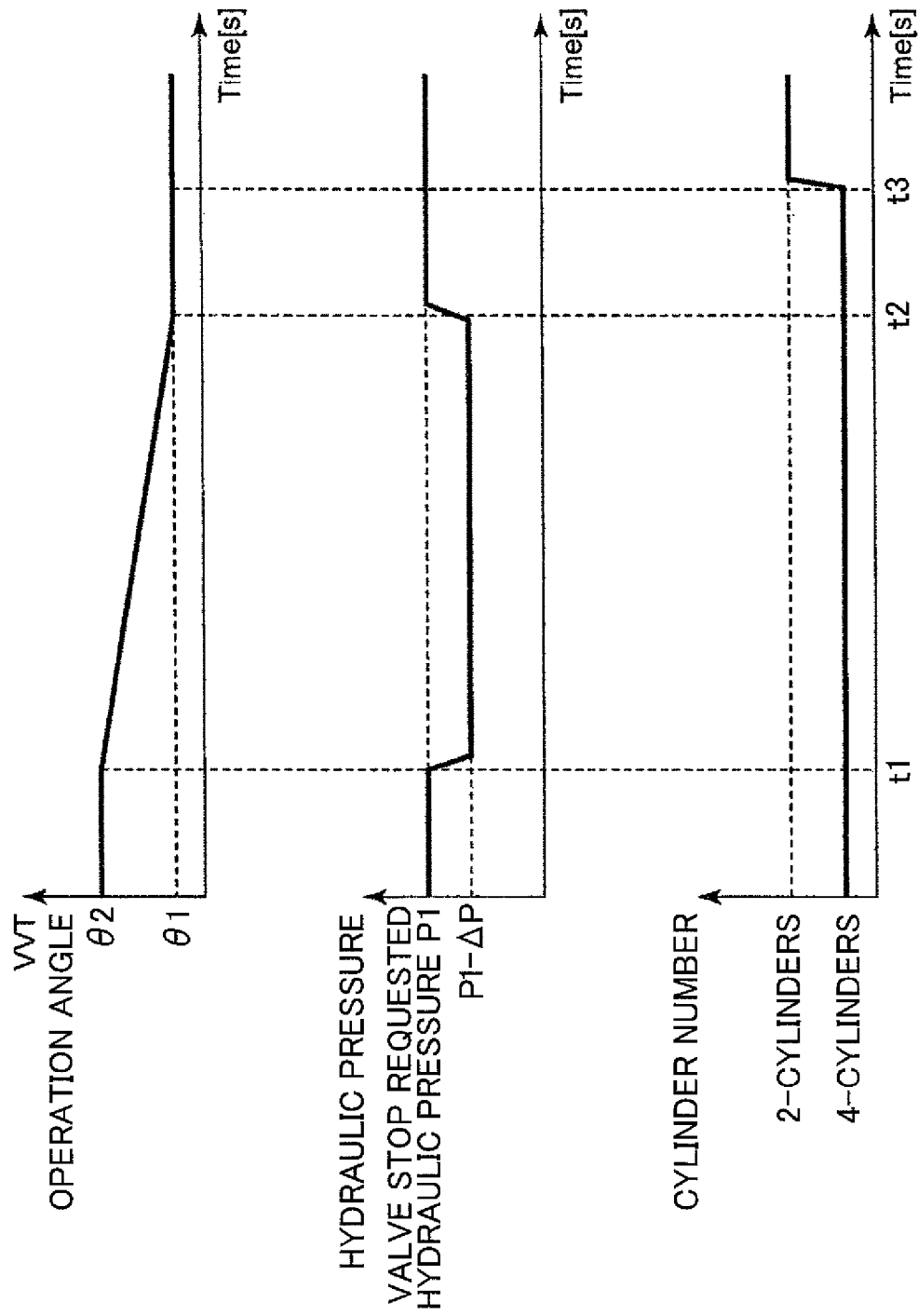
FIG. 12 is a time chart illustrating a control when the engine is switched to a reduced cylinder operation.

Next, a practical example in which the cylinder number control method illustrated in FIG. 11 is executed when the VVTs 32 and 33 are operated at the time of request for a reduced cylinder operation to allow the operating condition of the engine to fall in a reduced cylinder operation region is described, referring to FIG. 12.

At the point of time t1, the first direction switching valves 34 and 35 of the VVTs 32 and 33 are operated. Then, oil is started to be supplied to the advanced angle hydraulic pressure chambers 32a and 33a of the VVTs 32 and 33, whereby the operation angles of the VVTs 32 and 33 are changed (from $\theta2$ to $\theta1$). As a result, the hydraulic pressure is lowered than the valve stop requested hydraulic pressure P1.

When the current operating condition of the engine falls in the reduced cylinder operation region, and the valve stop operating condition is satisfied, the operations of the VVTs 32 and 33 are continued, and the valve stop mechanism 25b is kept in an inoperative state until the operation angles of the VVTs 32 and 33 reach the target operation angle $\theta1$, in other words, during a period of time when the hydraulic pressure is lower than the valve stop requested hydraulic pressure P1.

At the point of time t2, when the operation angles of the VVTs 32 and 33 reach the target operation angle $\theta1$, and the operations of the VVTs 32 and 33 are completed, supply of oil to the advanced angle hydraulic pressure chambers 32a and 336 of the VVTs 32 and 33 is finished. As a result, the hydraulic pressure returns to the valve stop requested hydraulic pressure P1.

At the point of time t3 after the point of time t2 when the hydraulic pressure returns to the valve stop requested hydraulic pressure P1, the second direction switching valves 46 and 47 are operated, and a hydraulic pressure is supplied to the valve stop mechanisms 25b. Then, the engine operation is switched from a four-cylinder operation to a two-cylinder operation. As described above, shifting the engine operation to a reduced cylinder operation (two-cylinder operation) after the advanced angle control of the VVTs 32 and 33 is executed means that the engine operation is shifted to a reduced cylinder operation in which the engine load is carried by two cylinders in a state that the intake charging amount is increased by advanced angle control of the intake valve 14 and the exhaust valve 15. This leads to reduction in rotation fluctuation of the engine.

Figure 13:
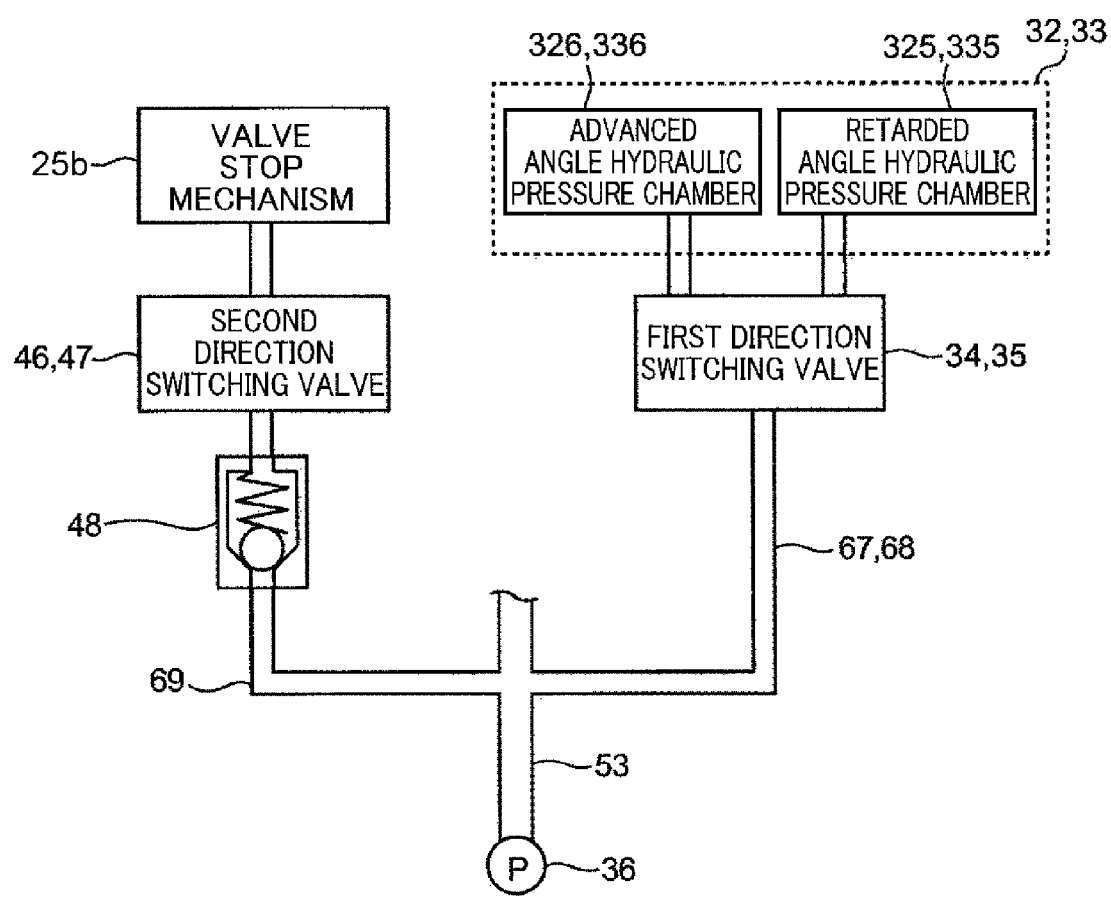
FIG. 13 is an enlarged view illustrating a configuration of a downstream portion of the oil supply device illustrated in FIG. 4.

FIG. 13 is an enlarged view of a configuration of a downstream portion of the oil supply device 1 illustrated in FIG. 4, and is a simplified diagram illustrating an intake side and an exhaust side of the oil supply device 1. As illustrated in FIG. 13, the oil paths 67, 68, and 69 are branched from the third communication passage 53 communicating with the main gallery 54 through which oil is discharged from the pump 36. The oil path 67 communicates with the advanced angle hydraulic pressure chambers 326 and with the retarded angle hydraulic pressure chambers 325 via the first direction switching valve 34, and the oil path 68 communicates with the advanced angle hydraulic pressure chambers 336 and with the retarded angle hydraulic pressure chambers 335 via the first direction switching valve 35, respectively. Further, the oil path 69 communicates with the valve stop mechanism 25b of the HLA 25 via the check valve 48 and the second direction switching valves 46 and 47.

The check valve 48 is urged by a spring to open when the hydraulic pressure of the third communication passage 53 is equal to or higher than the requested hydraulic pressure of the valve stop mechanism 25b so as to control oil to flow only in one direction from upstream toward downstream. Further, the check valve 48 is opened by a hydraulic pressure higher than the requested hydraulic pressures of the VVTs 32 and 33.

When the VVTs 32 and 33 are operated during a reduced cylinder operation of operating the valve stop mechanism 25b, the hydraulic pressure of the third communication passage 53 is lowered. However, the flow of oil from the valve stop mechanism 25b to the third communication passage 53 located upstream of the check valve 48 is blocked in the oil path 69 by the check valve 48 disposed in the oil path 69. This makes it possible to secure a requested hydraulic pressure of the valve stop mechanism 25b located downstream of the check valve 48 in the oil path 69.

As described above, in the embodiment, a highest requested hydraulic pressure out of the requested hydraulic pressures of the hydraulically operated devices such as the VVTs 32 and 33, the valve stop mechanisms 25b, and the oil jets 28 is specified with respect to each of the operating conditions of the engine. A target hydraulic pressure associated with an operating condition of the engine is set in advance and is stored as a hydraulic pressure control map, based on the highest requested hydraulic pressure (a reference target hydraulic pressure), and a target hydraulic pressure at the current point of time is set from the hydraulic pressure control map. According to this configuration, simply making the hydraulic pressure of an oil path to coincide with the target hydraulic pressure makes it possible to secure a requested hydraulic pressure such as an operating hydraulic pressure and an oil injection pressure of each of the hydraulically operated devices. Further, feedback control of a hydraulic pressure of the oil path is performed based on a detection value in order to obtain the aforementioned target hydraulic pressure. This makes it possible to precisely control the capacity of the pump 36. This is advantageous in increasing the fuel economy of the engine.

Further, a corrected hydraulic pressure higher than the highest requested hydraulic pressure is set as a target hydraulic pressure by the hydraulic pressure control map in the region (a reduced cylinder operation preparatory region) adjacent to an engine operation region (a reduced cylinder operation region) where the valve stop mechanism 25b is operated. Therefore, controlling the pump 36 based on the hydraulic pressure control map makes it possible to enhance the operation responsiveness of the valve stop mechanism 25b for promoting shifting to a reduced cylinder operation. This is advantageous in improving the fuel consumption reduction effect.

Further, when the VVTs 32 and 33 are operated, particularly, when the VVTs 32 and 33 on the intake side and on the exhaust side are concurrently operated when the amount of oil to be discharged from the pump 36 is small because of low-speed rotation of the engine 2, the hydraulic pressure of the third communication passage 53 communicating with the VVTs 32 and 33 is lowered. In the embodiment, however, the flow of oil in a portion between the third communication passage 53 and the valve stop mechanism 25b is blocked by the check valve 48 disposed in an oil path when the VVTs 32 and 33 are operated during a reduced cylinder operation. This makes it possible to prevent temporary lowering of the hydraulic pressure of the oil path due to operations of the VVTs 32 and 33. Thus, it is possible to prevent an erroneous operation of the valve stop mechanism 25b due to lowering of of the hydraulic pressure of oil to be supplied to the valve stop mechanism 25b, and to prevent a case that a reduced cylinder operation of keeping the intake valve 14 and the exhaust valve 15 in a stopped state is disabled. Therefore, changing the valve characteristics during a reduced cylinder operation is advantageous in increasing the fuel efficiency of the engine.

Further, when the hydraulic pressure of the third communication passage 53 is equal to or higher than the requested hydraulic pressure of the valve stop mechanism 25b, the hydraulic pressure of the oil path 69 is equal to the hydraulic pressure of the third communication passage 53, because the check valve 48 is opened. This makes it possible to supply a hydraulic pressure equal to or higher than the requested hydraulic pressure to the valve stop mechanism 25b. On the other hand, when the hydraulic pressure of the third communication passage 53 is lower than the requested hydraulic pressure of the valve stop mechanism 25b, the check valve 48 is closed. Therefore, the hydraulic pressure of the oil path 69 is not affected by the hydraulic pressure of the third communication passage 53, and the requested hydraulic pressure of the valve stop mechanism 25b is maintained. Thus, simply adding a configuration such that the spring-urged check valve 48 is mounted in the oil path 69 makes it possible to prevent an erroneous operation of the valve stop mechanism 25b without performing specific control.

Further, in the embodiment, when the VVTs 32 and 33 are operated at the time of request for a reduced cylinder operation, the valve stop mechanism 25b is operated after the operations of the VVTs 32 and 33 are completed. This allows for the valve stop mechanism 25b to operate after the hydraulic pressure that is lowered by operations of the VVTs 32 and 33 is increased. This makes it possible to prevent an erroneous operation of the valve stop mechanism 25b due to shortage of a hydraulic pressure. Therefore, it is possible to appropriately operate both of the VVTs 32 and 33, and the valve stop mechanism 25b. Further, the engine operation is shifted to a reduced cylinder operation after the characteristics of the intake valve or the exhaust valve are changed in such a direction as to increase the intake charging amount in order to reduce rotation fluctuation of the engine when the engine operation is shifted to the reduced cylinder operation. This makes it possible to shift the engine operation to the reduced cylinder operation, while reducing rotation fluctuation of the engine.

The invention is not limited to the foregoing exemplary embodiment. It is needless to say that various modifications and design changes are applicable as far as such modifications and design changes do not depart from the gist of the invention.

For instance, the embodiment is applied to an in-line 4-cylinder gasoline engine. However, the number of cylinders in the invention may be any number. Further, it is also possible to apply the invention to a diesel engine. Further, in the embodiment, a linear solenoid valve is used to control the pump 36. The invention is not limited to the above. An electromagnetic control valve may be used.

Further, when an object of the invention is to prevent an erroneous operation of the valve stop mechanism 25b when valve characteristic control by the VVTs 32 and 33 is performed during a reduced cylinder operation of operating the valve stop mechanism 25b, the aforementioned object can be accomplished by using a check valve 48 configured to open when the hydraulic pressure is equal to or higher than the requested hydraulic pressure of the valve stop mechanism 25b. Alternatively, it is possible to use a well-known electromagnetic control valve which is controllably openable and closable at an intended timing based on a hydraulic pressure of the main gallery 54, in place of using the check valve 48 configured as described above.

<Summary of Embodiment>

The following is a summary of the features and the advantageous effects of the embodiment as described above.

A control device disclosed in the embodiment is applied to a multi-cylinder engine provided with an oil pump; a hydraulically operated valve characteristic control device which changes valve characteristics of at least one of an intake valve and an exhaust valve; and a hydraulically operated valve stop device which stops at least one of the intake valve and the exhaust valve when a reduced cylinder operation is performed, the valve characteristic control device and the valve stop device being disposed on a discharge oil path of the oil pump. The control device is provided with a valve control unit which operates the valve stop device after an operation of the valve characteristic control device is completed when the valve characteristic control device is operated at a time of request for the reduced cylinder operation.

In the control device having the aforementioned configuration, when the valve characteristic control device is operated at the time of request for a reduced cylinder operation, the valve stop device is operated after the operation of the valve characteristic control device is completed. Therefore, the valve stop device is operated after the hydraulic pressure that is lowered by the operation of the valve characteristic control device is increased. This makes it possible to prevent an erroneous operation of the valve stop device due to shortage of a hydraulic pressure. Thus, the aforementioned configuration is advantageous in appropriately operating both of the valve characteristic control device and the valve stop device.

In the control device having the aforementioned configuration, preferably, the valve control unit may operate the valve stop device after the valve characteristic control device is operated in such a manner as to change the valve characteristics of at least one of the intake valve and the exhaust valve in such a direction as to increase an intake charging amount at the time of request for the reduced cylinder operation.

As described above, when the engine operation is shifted to a reduced cylinder operation after the characteristics of the intake valve or the exhaust valve are changed in such a direction as to increase the intake charging amount when the engine operation is shifted to the reduced cylinder operation, it is possible to shift the engine operation to the reduced cylinder operation while reducing rotation fluctuation of the engine.

In the control device having the aforementioned configuration, preferably, the oil pump may be an oil pump of a variable capacity type. The control device may further include a hydraulic pressure detecting unit which detects a discharge pressure of the pump; a storage unit which stores a hydraulic pressure control map in which a target hydraulic pressure associated with an operating condition of the engine is set in advance; and a pump control unit which reads a target hydraulic pressure at a current point of time from the stored hydraulic pressure control map, and changes a capacity of the pump so that the discharge pressure detected by the hydraulic pressure detecting unit coincides with the target hydraulic pressure read from the hydraulic pressure control map to control the discharge pressure. The hydraulic pressure control map may include an engine rotation speed, an engine load, and an oil temperature, as parameters indicating the operating conditions of the engine. When an engine operation region to be specified from each of the parameters is a region adjacent to an operation region where the valve stop device is operated, a corrected hydraulic pressure higher than a highest requested hydraulic pressure out of requested hydraulic pressures of various hydraulically operated devices to be operated in the adjacent region may be set as the target hydraulic pressure.

According to the aforementioned configuration, a corrected hydraulic pressure higher than the highest requested hydraulic pressure is set in a region adjacent to the engine operation region where the valve stop device is operated, as a target hydraulic pressure which is set in advance in the hydraulic pressure control map. Therefore, controlling the pump based on the hydraulic pressure control map makes it possible to enhance the operation responsiveness of the valve stop device and to promote shifting to the reduced cylinder operation. This is advantageous in improving the fuel consumption reduction effect.

In the control device having the aforementioned configuration, preferably, the valve characteristic control device may be provided with an advanced angle hydraulic pressure chamber and a retarded angle hydraulic pressure chamber, and the valve characteristic control device may control a hydraulic pressure to be supplied to each of the hydraulic pressure chambers so as to change a relative rotation phase between a camshaft and a crankshaft.

According to the aforementioned configuration, the valve characteristic control device is a variable valve timing mechanism provided with an advanced angle hydraulic pressure chamber and a retarded angle hydraulic pressure chamber. Even when it is necessary to operate the valve characteristic control device when the engine operation is shifted to the reduced cylinder operation, as well as the aforementioned configuration, it is possible to securely prevent an erroneous operation of the valve stop device due to shortage of a hydraulic pressure, and to shift the engine operation to the reduced cylinder operation while reducing rotation fluctuation of the engine.

In the control device having the aforementioned configuration, preferably, a check valve for controlling oil to flow only in one direction from upstream toward downstream may be provided in an oil path through which oil from the oil pump is introduced to the valve stop device.

According to the aforementioned configuration, even when the valve characteristic control device is operated during a reduced cylinder operation, the check valve disposed in an oil path blocks backflow of oil. Therefore, it is possible to prevent temporary lowering of the hydraulic pressure of the oil path due to an operation of the valve characteristic control device. Thus, it is possible to prevent an erroneous operation of the valve stop device due to lowering of of the hydraulic pressure of oil to be supplied to the valve stop device, and to prevent a case that a reduced cylinder operation of keeping the intake valve and the exhaust valve in a stopped state is disabled.

INDUSTRIAL APPLICABILITY

As described above, according to the invention, even when a request of performing a reduced cylinder operation and a request of changing valve characteristics are output in such a manner that operation periods of a hydraulically operated valve stop device and a hydraulically operated valve characteristic control device to be operated based on these requests overlap each other, it is possible to appropriately operate the valve stop device and the valve characteristic control device. Therefore, the invention is advantageously applied to the industrial field of manufacturing engines of this type.

The invention claimed is:

1. A control device for a multi-cylinder engine provided with an oil pump;
   a hydraulically operated variable valve device which changes valve opening characteristics of at least one of an intake valve and an exhaust valve; and
   a hydraulically operated valve stop device which stops at least one of the intake valve and the exhaust valve when a reduced cylinder operation is performed, the variable valve device and the valve stop device being individually disposed on a discharge oil path of the oil pump, comprising:
   a hydraulic control device configured to control a hydraulic pressure to be supplied to each of the variable valve device and the valve stop device,
   wherein the hydraulic control device is configured to operate the variable valve device, in response to request for the reduced cylinder operation, to change the valve opening characteristics of at least one of the intake valve and the exhaust valve in such a direction as to increase an intake charging amount, and after completion of the change of the valve opening characteristics, operates the valve stop device to stop at least one of the intake valve and the exhaust valve.

2. The control device for a multi-cylinder engine according to claim 1, wherein
   the variable valve device is provided with an advanced angle hydraulic pressure chamber and a retarded angle hydraulic pressure chamber, and is configured to change a relative rotation phase between a camshaft and a crankshaft by controlling a hydraulic pressure to be supplied to each of the hydraulic pressure chambers.

3. The control device for a multi-cylinder engine according to claim 1, wherein
   a check valve for controlling oil to flow only in one direction from upstream toward downstream is provided in an oil path through which oil from the oil pump is introduced to the valve stop device.

4. The control device for a multi-cylinder engine according to claim 1, wherein
   the hydraulic control device is configured to operate the valve stop device after a predetermined time has elapsed from completion of the change of the valve opening characteristics of the at least one of the intake valve and the exhaust valve.

5. A control device for a multi-cylinder engine provided with an oil pump;
   a hydraulically operated variable valve device which changes valve opening characteristics of at least one of an intake valve and an exhaust valve; and
   a hydraulically operated valve stop device which stops at least one of the intake valve and the exhaust valve when a reduced cylinder operation is performed, the variable valve device and the valve stop device being individually disposed on a discharge oil path of the oil pump, comprising:
   a hydraulic control device which controls a hydraulic pressure to be supplied to each of the variable valve device and the valve stop device,
   wherein the hydraulic control device operates the variable valve device, in response to request for the reduced cylinder operation, to change the valve opening characteristics of at least one of the intake valve and the exhaust valve in such a direction as to increase an intake charging amount, and after that, operates the valve stop device to stop at least one of the intake valve and the exhaust valve,
   wherein
   the oil pump is an oil pump of a capacity variable type, the control device further includes:
      a hydraulic pressure detecting unit which detects a discharge pressure of the pump;
      a storage unit which stores a hydraulic pressure control map in which a target hydraulic pressure associated with an operating condition of the engine is set in advance; and
      a pump control unit which reads a target hydraulic pressure at a current point of time from the stored hydraulic pressure control map, and changes a capacity of the pump so that the discharge pressure detected by the hydraulic pressure detecting unit coincides with the target hydraulic pressure read from the hydraulic pressure control map to control the discharge pressure,
   the hydraulic pressure control map includes an engine rotation speed, an engine load, and an oil temperature, as parameters indicating the operating conditions of the engine, and
   when an engine operation region to be specified from each of the parameters is a region adjacent to an operation region where the valve stop device is operated, a corrected hydraulic pressure higher than a highest requested hydraulic pressure out of requested hydraulic pressures of various hydraulically operated devices to be operated in the adjacent region is set as the target hydraulic pressure.

6. A control device for a multi-cylinder engine provided with an oil pump; a hydraulically operated variable valve timing device which changes opening or closing timing of at least one of an intake valve and an exhaust valve; and a hydraulically operated valve stop device which stops at least one of the intake valve and the exhaust valve when a reduced cylinder operation is performed, the variable valve timing device and the valve stop device being individually disposed on a discharge oil path of the oil pump, comprising:
  a hydraulic control device configured to control a hydraulic pressure to be supplied to each of the variable valve timing device and the valve stop device; and
  a cam angle sensor for detecting an operation angle of the variable valve timing device,
  wherein the hydraulic control device is configured to operate the variable valve timing device, in response to request for switching to the reduced cylinder operation from an all cylinder operation, to change the opening or closing timing of at least one of the intake valve and the exhaust valve in such a direction as to increase an intake charging amount while prohibiting an activation of the valve stop device, and after completion of changing the opening or closing timing, operates the valve stop device to stop at least one of the intake valve and the exhaust valve, and
  the completion of changing the opening or closing timing being confirmed by determining whether the operation angle of the variable valve timing device specified based on a detection value of the cam angle sensor reaches a target operation angle.

7. The control device for a multi-cylinder engine according to claim 6, wherein
  the variable valve timing device is provided with an advanced angle hydraulic pressure chamber and a retarded angle hydraulic pressure chamber, and is configured to change a relative rotation phase between a camshaft and a crankshaft by controlling a hydraulic pressure to be supplied to each of the hydraulic pressure chambers, and
  the valve stop device is provided with an outer sleeve slidably accommodating a pivot mechanism that serves as a fulcrum of a swing arm provided for the intake valve or the exhaust valve, and a locking pin which is movable in and out of a through-hole formed in the outer sleeve for switching the pivot mechanism between a locked state and a lock released state.

8. A control device for a multi-cylinder engine provided with an oil pump;
  a hydraulically operated variable valve device which changes valve opening characteristics of at least one of an intake valve and an exhaust valve; and
  a hydraulically operated valve stop device which stops at least one of the intake valve and the exhaust valve when a reduced cylinder operation is performed, the variable valve device and the valve stop device being individually disposed on a discharge oil path of the oil pump, comprising:
  a hydraulic control device which controls a hydraulic pressure to be supplied to each of the variable valve device and the valve stop device,
  wherein the hydraulic control device is configured to operate the variable valve device, in response to request for the reduced cylinder operation, to change the valve opening characteristics of at least one of the intake valve and the exhaust valve in such a direction as to increase an intake charging amount, and after that, operates the valve stop device to stop at least one of the intake valve and the exhaust valve, the operation of the valve stop device being prohibited while the change of the valve opening characteristics occurs.

9. A control device for a multi-cylinder engine provided with an oil pump;
  a hydraulically operated variable valve device which changes valve opening characteristics of at least one of an intake valve and an exhaust valve; and
  a hydraulically operated valve stop device which stops at least one of the intake valve and the exhaust valve when a reduced cylinder operation is performed, the variable valve device and the valve stop device being individually disposed on a discharge oil path of the oil pump, comprising:
  a hydraulic control device which controls a hydraulic pressure to be supplied to each of the variable valve device and the valve stop device,
  wherein the hydraulic control device is configured to operate the variable valve device, in response to request for the reduced cylinder operation, to change the valve opening characteristics of at least one of the intake valve and the exhaust valve in such a direction as to increase an intake charging amount, and after that operates the valve stop device to stop at least one of the intake valve and the exhaust valve, the operation of the valve stop device is not being performed while the change of the valve opening characteristics occurs.

10. A method of controlling a multi-cylinder engine with a control device, the multi-cylinder engine provided with:
  an oil pump;
  a hydraulically operated variable valve device which changes valve opening characteristics of at least one of an intake valve and an exhaust valve; and
  a hydraulically operated valve stop device which stops at least one of the intake valve and the exhaust valve when a reduced cylinder operation is performed, the variable valve device and the valve stop device being individually disposed on a discharge oil path of the oil pump,
  the control device comprising:
  a hydraulic control device configured to control a hydraulic pressure to be supplied to each of the variable valve device and the valve stop device,
  the method comprising:
  operating the hydraulic control device to operate the variable valve device, in response to request for the reduced cylinder operation, to change the valve opening characteristics of at least one of the intake valve and the exhaust valve in such a direction as to increase an intake charging amount; and
  after completion of the change of the valve opening characteristics, operating the valve stop device to stop at least one of the intake valve and the exhaust valve.

11. A method of controlling a multi-cylinder engine with a control device, the multi-cylinder engine provided with:
  an oil pump;
  a hydraulically operated variable valve timing device which changes opening or closing timing of at least one of an intake valve and an exhaust valve; and
  a hydraulically operated valve stop device which stops at least one of the intake valve and the exhaust valve when a reduced cylinder operation is performed, the variable valve timing device and the valve stop device being individually disposed on a discharge oil path of the oil pump, the control device comprising:
a hydraulic control device configured to control a hydraulic pressure to be supplied to each of the variable valve timing device and the valve stop device; and
a cam angle sensor for detecting an operation angle of the variable valve timing device,
the method comprising:
operating the hydraulic control device to operate the variable valve timing device, in response to request for switching to the reduced cylinder operation from an all cylinder operation, to change the opening or closing timing of at least one of the intake valve and the exhaust valve in such a direction as to increase an intake charging amount while prohibiting an activation of the valve stop device;
after completion of changing the opening or closing timing, operating the valve stop device to stop at least one of the intake valve and the exhaust valve; and
confirming the completion of changing the opening or closing timing by determining whether the operation angle of the variable valve timing device specified based on a detection value of the cam angle sensor reaches a target operation angle.

* * * * *